(12) United States Patent
Kazama et al.

(10) Patent No.: US 6,226,856 B1
(45) Date of Patent: May 8, 2001

(54) METHOD OF MANUFACTURING CORES FOR ROTARY ELECTRIC MACHINES

(75) Inventors: Katsutoshi Kazama, Takefu; Hisataka Kato, Sabae; Kadai Takinami; Manabu Okamoto, both of Takefu, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/929,135

(22) Filed: Sep. 5, 1997

(30) Foreign Application Priority Data

Sep. 30, 1996 (JP) .................................................. 8-257928

(51) Int. Cl.$^7$ .................................................. H02K 15/02
(52) U.S. Cl. .................................. 29/596; 29/609; 310/42; 310/216
(58) Field of Search .............................. 29/596, 598, 605, 29/600, 609; 310/216–218, 42, 154

(56) References Cited

U.S. PATENT DOCUMENTS

| 3,802,066 | 4/1974 | Barrett | 29/596 |
| 4,102,040 | * 7/1978 | Rich | 29/596 X |
| 4,365,180 | * 12/1982 | Licata et al. | 29/598 X |
| 5,592,731 | * 1/1997 | Huang et al. | 29/596 |

FOREIGN PATENT DOCUMENTS

| 39 06 368 A1 | 9/1989 | (DE) . |
| 0 629 034 A2 | 12/1994 | (EP) . |
| 0 629 034 A3 | 12/1994 | (EP) . |
| 2 014 374 | 8/1979 | (GB) . |
| 52-34301 | * 3/1977 | (JP) . |
| 61-30939 | 2/1986 | (JP) . |
| 01252141 | * 6/1989 | (JP) . |
| 01264548 | * 10/1989 | (JP) . |

* cited by examiner

*Primary Examiner*—Carl E. Hall
(74) *Attorney, Agent, or Firm*—Parkhurst & Wendel, L.L.P.

(57) ABSTRACT

A stator core which assures a favorable workability for coupling core segments and has favorable magnetic characteristics even when made by coupling core segments that are formed by laminating core division sheets. A method of manufacturing a core for rotary electric machines includes forming a coupling convexity having an arc-like planar shape and a coupling concavity engageable with the coupling convexity on core segments, forming a serial core segment assembly by engaging the coupling convexity on one of the core segments with the coupling concavity formed on an adjacent core segment so as to be rotatable by more than 180 degrees, and forming a magnetic circuit by bending the serial core segment assembly into an annular form.

7 Claims, 20 Drawing Sheets

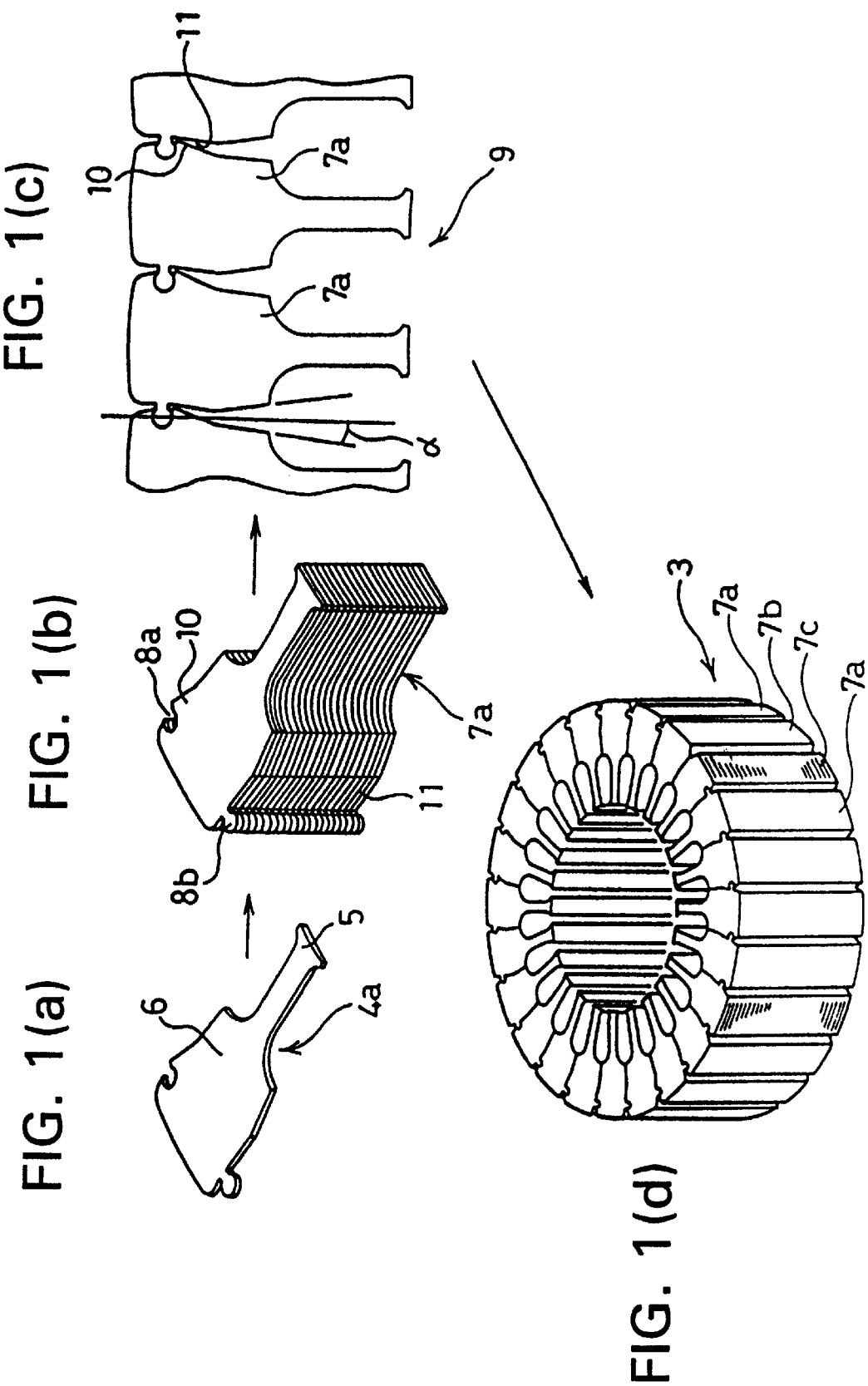

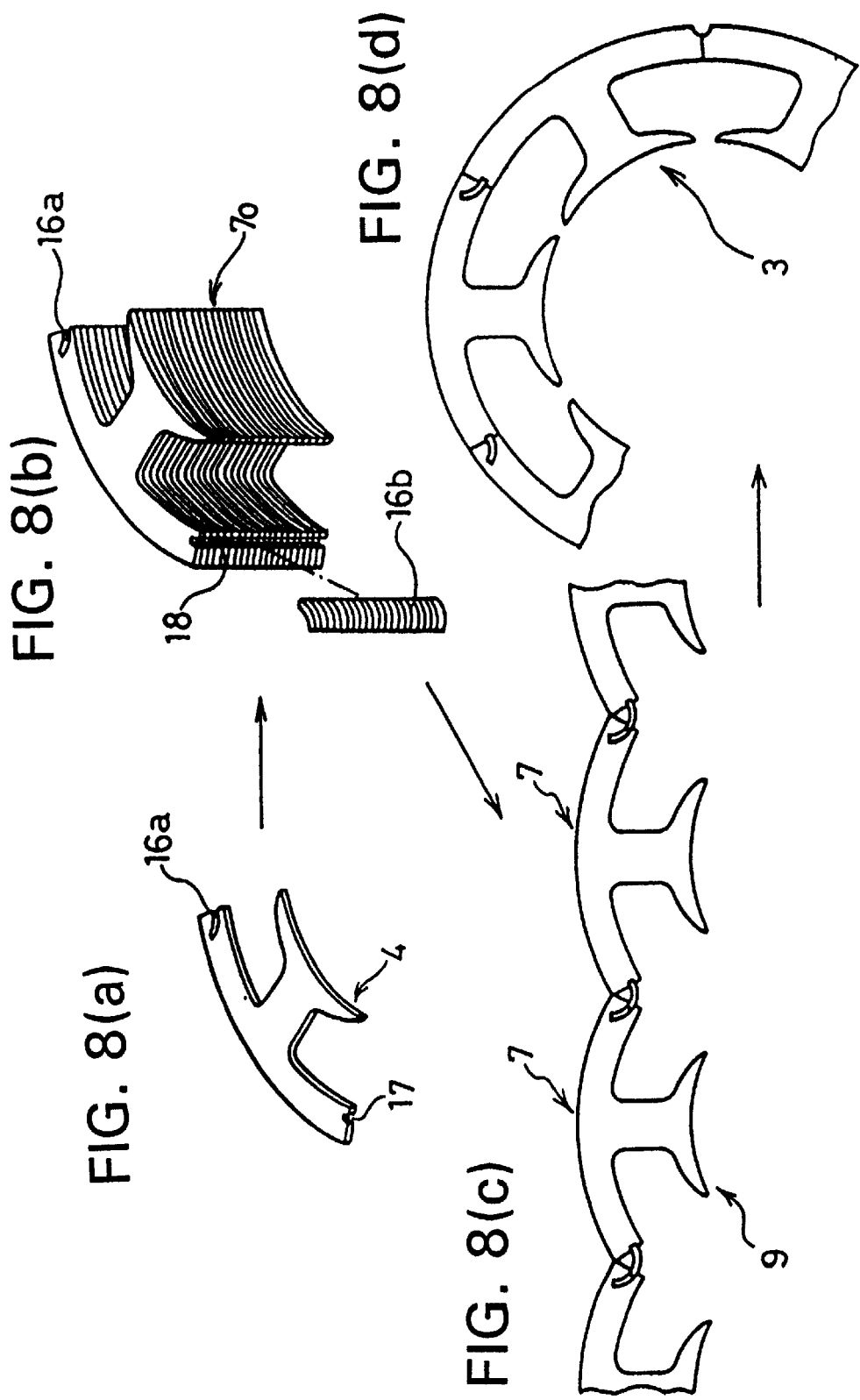

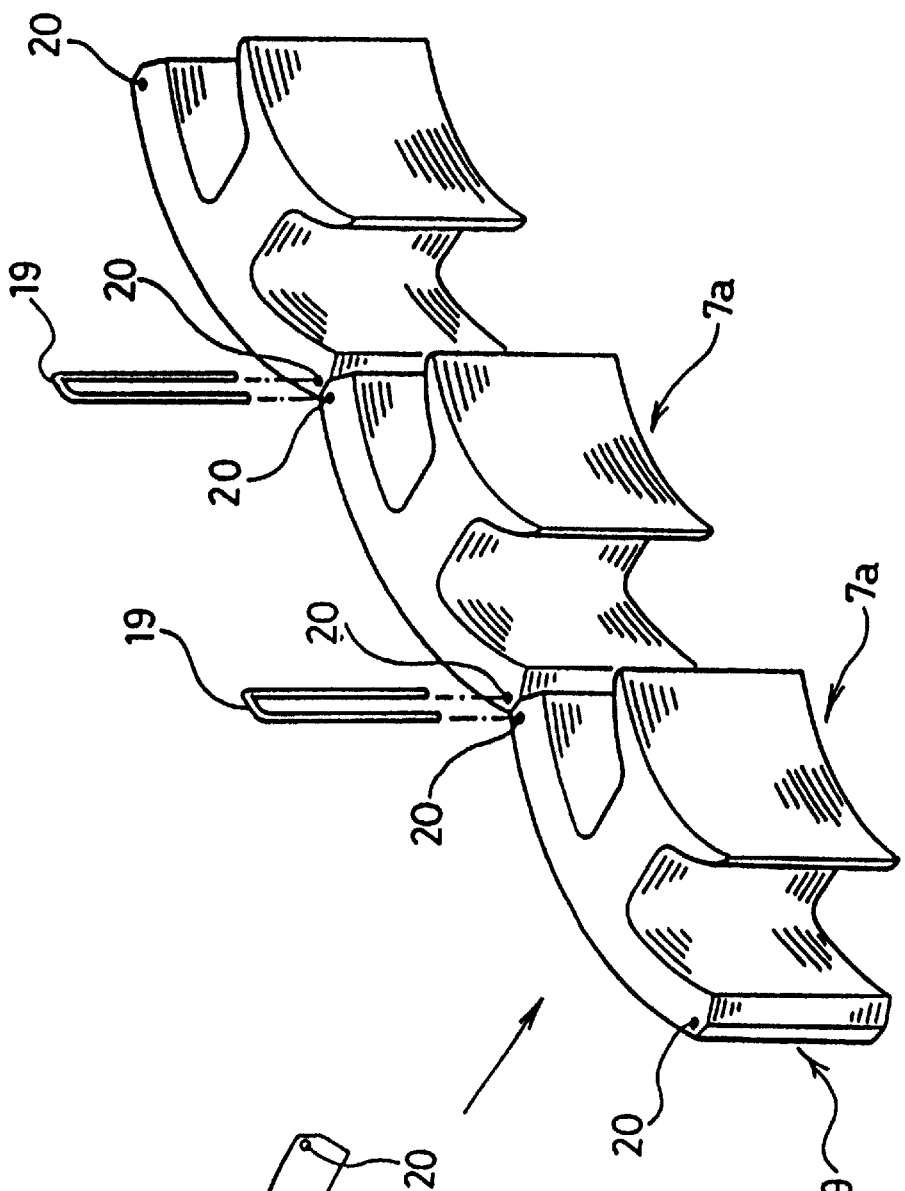
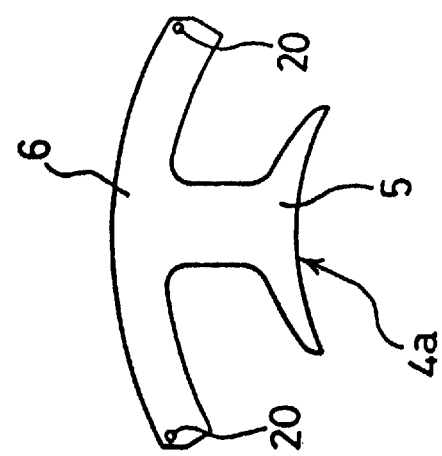

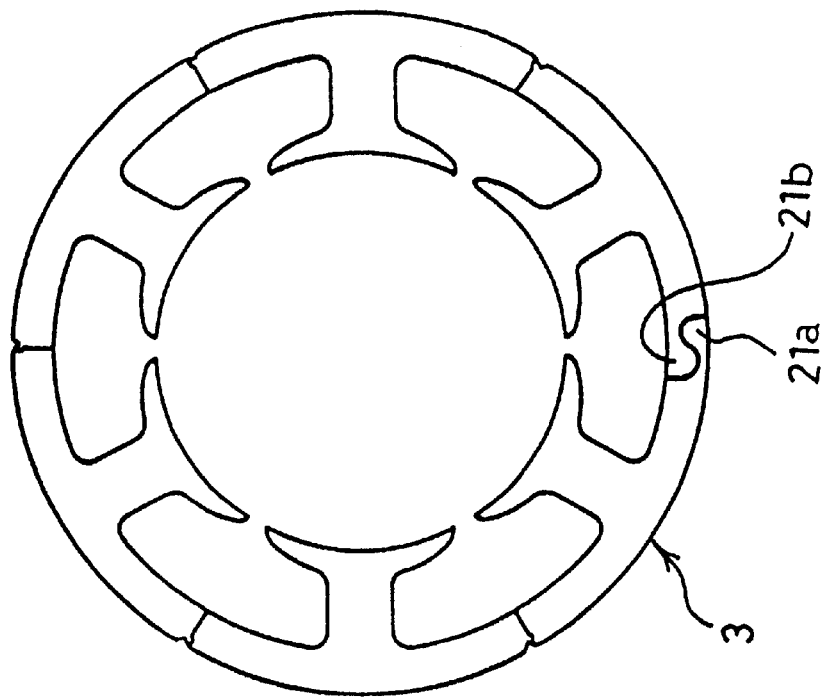
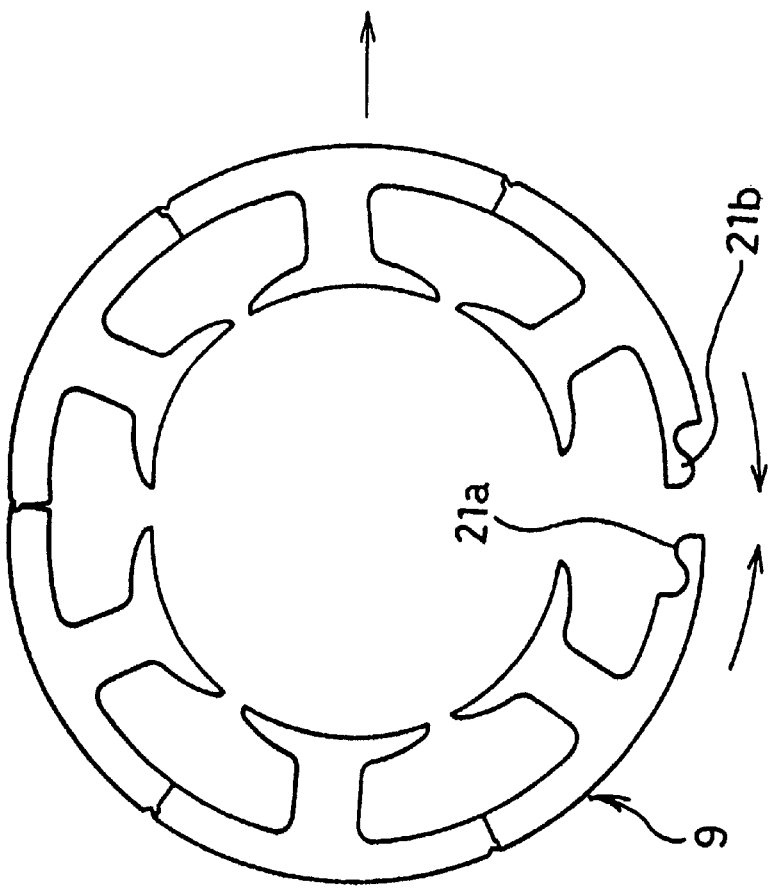

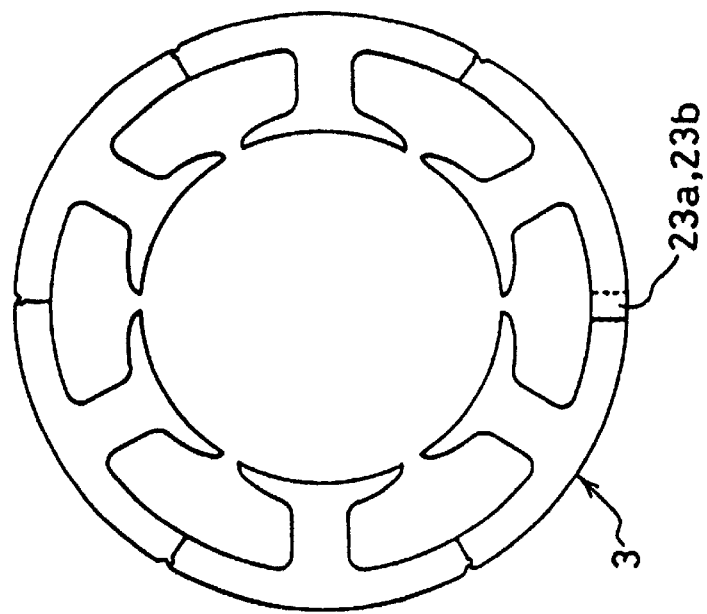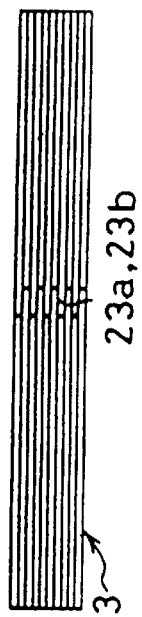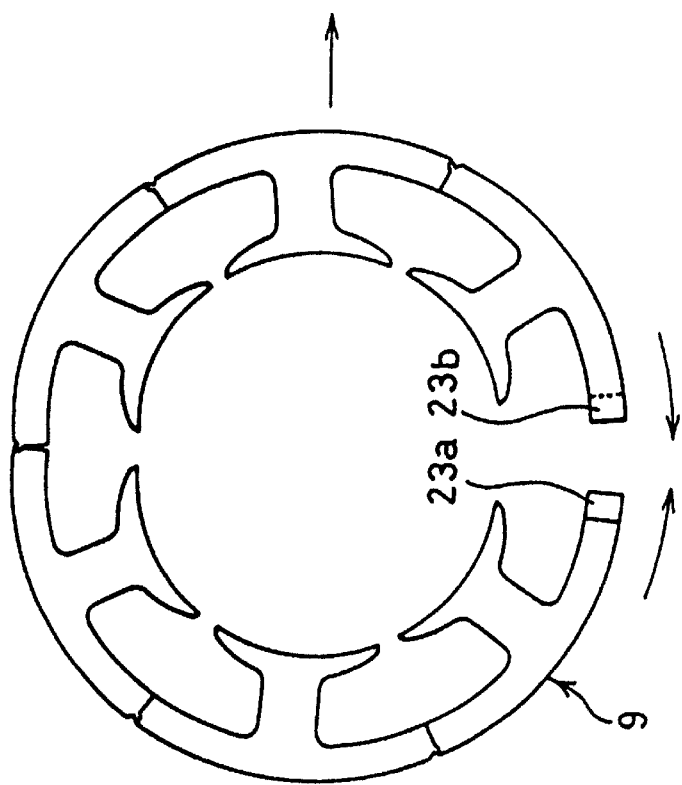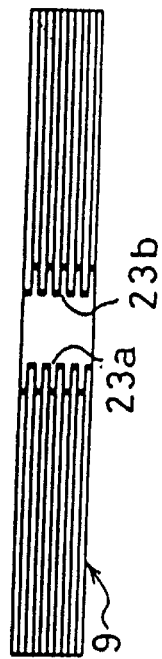
FIG. 13(a)
FIG. 13(b)

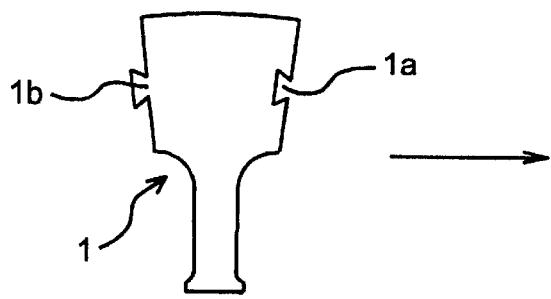
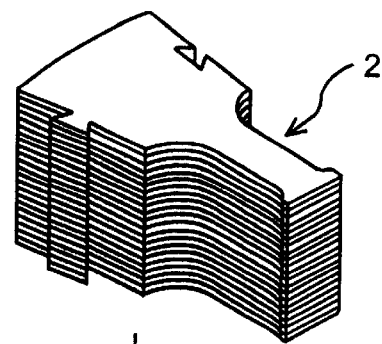
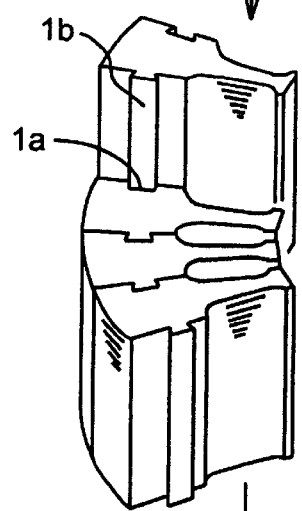
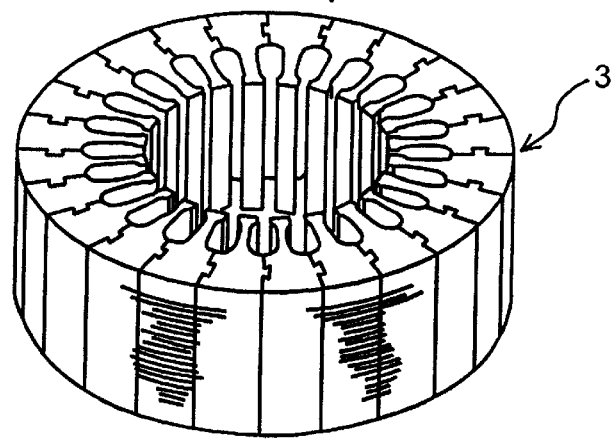
FIG. 20(a)
FIG. 20(b)
FIG. 20(c)
FIG. 20(d)

METHOD OF MANUFACTURING CORES FOR ROTARY ELECTRIC MACHINES

FIELD OF THE INVENTION

The present invention relates to a manufacturing method of a core for rotary electric machines which is composed of laminated magnetic steel sheets.

BACKGROUND OF THE INVENTION

Among the conventional methods for manufacturing stator cores for rotary electric machines, there is a first method by which a cylindrical core is manufactured by punching out annular sheet cores by press work and laminating these sheet cores.

This first manufacturing method by which the annular sheet cores are punched out by the press work produces waste portions inside and outside of the sheet cores, thereby lowering yield.

A second manufacturing method, which improves the yield, is illustrated in FIGS. 20(a) through 20(d).

According to the second method, a core division sheet 1 which has an engaging concavity 1a and an engaging convexity 1b as shown in FIG. 20(a) is first punched out by press work. A core segment 2 is composed by laminating such core division sheets 1 as shown in FIG. 20(b), the engaging convexity 1b of the core segment 2 is positioned to against one end of the engaging concavity 1a of an adjacent core segment 2 as shown in FIG. 20(c) and the convexity 1b is slid or inserted into the concavity 1a for coupling the core segments 2, thereby forming a cylindrical stator core 3 as shown in FIG. 20(d).

DISCLOSURE OF THE INVENTION

The second manufacturing method by which the divided core sheets 1 are punched out by the press work does not produces waste portions unlike the first manufacturing method and provides a favorable yield, but poses a problem that workability is low at the coupling stage shown in FIG. 20(c). Speaking of a measure to obtain a favorable stator core 3 by lowering magnetic reluctance, it is necessary to reduce clearance between the coupled core segments, including the concavity 1a and the engaging convexity 1b, so as to eliminate a play among the coupled core segments 2, but a smaller play will require higher dimensional precision for coupling the core segments 2.

Further, a stronger inserting force is required at a stage to engage a starting end of the engaging concavity with one end of the engaging convexity and slide the core segment 2 since the engaging convexity is inserted while causing friction not only between the engaging concavity 1a and the engaging convexity 1b but also over the entire joined surfaces including those of the engaging concavity and the engaging convexity.

A primary object of the present invention is to provide a stator core which allows core segments to be coupled with high workability and has favorable magnetic characteristics even when the stator core is manufactured by punching out core division sheets by press working and coupling core segments formed by laminating the divided core sheets so as to obtain a favorable blanking yield.

A method of manufacturing a core for rotary electric machines according to the present invention is configured to compose serial core segment assembly by coupling a plurality of core segments which are composed of laminated core division sheets, and then form a cylindrical core by bringing both ends of the serial core segment assembly into contact with each other so as to bend it into an annular form.

According to the present invention, it is possible to obtain stator core which assures a high blanking yield, high workability for core segment coupling and a favorable magnetic characteristics.

A method of manufacturing a core for rotary electric machines, according to a first aspect of the present invention, includes forming a plurality of core segments by laminating core division sheets on which tees are formed, forming a serial core segment assembly by coupling adjacent core segments with one another, bend the serial core segment assembly into an annular form so that yokes of all the adjacent core segments are brought into contact with one another and bringing yokes of core segments located at both ends of the serial core segment assembly into contact with each other, thereby forming a magnetic circuit.

A method of manufacturing a core for rotary electric machines, according to a second aspect of the present invention, includes coupling adjacent core segments with each other at a location which will form an outer circumference when the magnetic circuit is formed by bending the serial core segment assembly into the annular form at the stage to compose the serial core segment assembly by coupling the adjacent core segments with one another.

A method of manufacturing a core for rotary electric machine, according to a third aspect of the present invention, includes fixing both the ends of the serial core segment assembly by welding or cementing them to each other after the magnetic circuit is formed by bending the serial core segment assembly into the annular form and bringing the yokes at both the ends of the serial core segment assembly into contact with each other.

A method of manufacturing a core for rotary electric machine, in accordance with a fourth aspect of the present invention, includes coupling both the ends of the serial core segment assembly with each other using a coupling device after the magnetic circuit is formed by bending the serial core segment assembly into the annular form and bringing the yokes of the core segments located at both the ends of the serial core segment assembly into contact with each other.

A method of manufacturing a core for rotary electric machines, according to a fifth aspect of the present invention, includes laminating core division sheets on which tees are formed, molding resin on surfaces of the core segments except end surfaces of yokes thereof, forming a serial core segment assembly by coupling adjacent core segments with one another, bend the serial core segment assembly into an annular form so that yokes of all adjacent core segments are brought into contact with one another, bring yokes of core segments located at both the ends of the serial core segment assembly into contact with each other for forming a magnetic circuit and coupling both the ends of the serial core segment assembly by welding the molded material at both the ends of the serial core segment assembly.

A method of manufacturing a core for rotary electric machine, according to a sixth aspect of the present invention, includes forming a plurality of core segments by laminating core division sheets on which tees are formed, forming a serial core segment assembly by coupling adjacent core segments with one another, molding resin on the surfaces of the serial core segment assembly except end surfaces of yokes of the core segments, bending the serial core segment assembly into an annular form so that yokes of all the adjacent core segments are brought into contact with one another, forming a magnetic circuit by bringing yokes of core segments located at both the ends of the serial core segment assembly into contact with each other and couple both the ends of the serial core segment assembly with each other by welding the molded material at both the ends of the serial core segment assembly.

A method of manufacturing a core for rotary electric machines, according to a seventh aspect of the present invention, includes forming a plurality of core segments by laminating core division sheets on which tees are formed, forming a serial core segment assembly by coupling adjacent core segments with one another, bending the serial core segment assembly into an annular form so that yokes of all adjacent core segments are brought into contact with one another, forming a magnetic circuit by bringing yokes of the core segments disposed at both ends of the serial core segment assembly into contact with each other and couple both the ends of the serial core segment assembly with each other by molding resin on the serial core segment assembly bent in the annular form.

A method of manufacturing a core for rotary electric machines, according to an eighth aspect of the present invention, includes coupling both the ends of the serial core segment assembly with each other by engaging a first engaging portion formed at one end of the serial core segment assembly with a second engaging portion formed at the other end of the serial core segment assembly after the magnetic circuit is formed by bending the serial core segment assembly into the annular form and bringing the yokes of the core segments located at both the ends of the serial core segment assembly into contact with each other.

A method of manufacturing a core for rotary electric machines, according to a ninth aspect of the present invention, includes coupling the ends of the serial core segment assembly by overlapping and engaging first and second engaging portions in a radial direction of the serial core segment assembly bent in the annular form.

A method of manufacturing a core for rotary electric machines, according to a tenth aspect of the present invention, includes coupling both the ends of the serial core segment assembly by overlapping and engaging the first and second engaging portions laminated in the laminated direction of the core division sheets.

A core for rotary electric machines, according to an eleventh aspect of the present invention, comprises a core for rotary electric machines whose magnetic circuit is formed by forming a plurality of core segments of laminated core division sheets having tees formed thereon, coupling the core segments with one another so as to form a serial core segment assembly, bending the serial core segment assembly into an annular form so that yokes of all adjacent core segments are brought into contact with one another and bringing yokes of core segments located at both ends of the serial core segment assembly into contact with each other, characterized in that coupling portions for coupling adjacent core segments with one another are disposed over the entire region in the laminated direction of the core segments.

A core for rotary electric machines, according to a twelfth aspect of the present invention, comprises a core for rotary electric machines whose magnetic circuit is formed by forming a plurality of core segments of laminated core division sheets having tees formed thereon, coupling the core segments with one another so as to form a serial core segment assembly, bending the serial core segment assembly into an annular form so that yokes of all adjacent core segments are brought into contact with one another and bringing yokes of core segments located at both ends of the serial core segment assembly into contact with each other, characterized in that coupling portions for coupling the adjacent core segments to one another are formed in a partial region in the laminated direction of the core division sheets.

A core for rotary electric machines, according to a thirteenth aspect of the present invention, comprises a core having a concavity formed on an end surface of the yoke of the core segment over the entire region in the laminated direction of the core division sheets as coupling portions for coupling adjacent core segments with one another and a convexity is formed on the other end surface of the yoke of the core segment at a location corresponding to the concavity over a partial region in the laminated direction of the core division sheets.

A manufacturing method of a core for rotary electric machines as claimed in claim 14 of the present invention is a method according to claim 1 or 2, characterized in that it is configured to engage a coupling convexity which is formed on one of adjacent core segments and has an arc-like tip in a planar shape with the other core segment rotatably over 180 degrees so that an arm connecting a root to a tip of the coupling convexity of the core segment will not be plastically deformed at the stages to compose the serial core segment assembly by engaging the coupling convexity formed on the core segment with the other core segment, and to form the magnetic circuit by bending the serial core segment assembly into the annular form and bringing the yokes of the core segment located at both the ends of the serial core segment assembly into contact with each other.

A manufacturing method of a core for rotary electric machines as claimed in claim 15 of the present invention is a method according to claim 1 or 2, characterized in that it is configured to engage a coupling convexity which is formed on one of adjacent core segments and has an arc-like tip in a planar shape with the other core segment rotatably within a defined range over 180 degrees and allow an arm connecting a root to the tip of the coupling convexity of the core segment to be plastically deformed in the course of the bending of the serial core segment assembly into the annular form at the stages to compose the serial core segment assembly by engaging the coupling convexity on one of adjacent core segments with the other core segment, and to form the magnetic circuit by bending the serial core segment assembly into the annular form and bringing the yokes of the core segments located at both the ends of the serial core segment assembly into contact with each other.

A method of manufacturing a core for rotary electric machines, according to a sixteenth aspect of the present invention, includes allowing an arm connecting a root to a tip of the coupling convexity to be plastically deformed while the coupling convexity formed on one of adjacent core segments is fitted into the other core segment and the serial core segment assembly is bent into the annular form at the stages to compose the serial core segment assembly by engaging the coupling convexity formed on one of adjacent core segments with the other core segment, and to form the magnetic circuit by bending the serial core segment assembly into the annular form and bringing the yokes of the core segments located at both the ends of the serial core segment assembly into contact with each other.

A method of manufacturing a core for rotary electric machines, according to a seventeenth aspect of the present invention, includes pressing or inserting the coupling convexity toward depth of the coupling concavity while the arc-shaped tip of the coupling convexity formed on one of the adjacent core segments is engaged with the arc-shaped coupling concavity formed in the other core segment and the serial core segment assembly is bent into the annular form at the stages to compose the serial core segment assembly by engaging the coupling convexity formed on one of the adjacent core segments with the other core segment, and to forming the magnetic circuit by bending the serial core segment assembly into the annular form and bringing the yokes of the core segments located at both the ends of the serial core segment assembly into contact with each other.

A method of manufacturing a core for rotary electric machines, according to an eighteenth aspect of the present invention, includes coupling adjacent core segments with each other by using a coupling pin and allowing the coupling pin to be deformed for bending the serial core segment assembly into the annular form at the stages to compose the serial core segment assembly by engaging the coupling convexity formed on one of adjacent core segments with the other core segment, and forming the magnetic circuit by bending the serial core segment assembly into the annular form and bringing the yokes of the core segments located at both the ends of the serial core segment assembly into contact with each other.

A method of manufacturing a core for rotary electric machines, according to a nineteenth aspect of the present invention, includes using a coupling pin as the coupling device.

A method of manufacturing a core for rotary electric machines, according to a twentieth aspect of the present invention, includes continuously winding a wire in series around a plurality of tees of the serial core segment assembly and form a magnetic circuit by bending the serial core segment assembly having the continuous windings into an annular form.

A method of manufacturing a core for rotary electric machines, according to a twenty-first aspect of the present invention, includes fixing by welding portions which are to form outer circumferences of the coupling portions of the serial core segment assembly after the magnetic circuit is composed by bending the serial core segment assembly into the annular form and bringing the yokes of the core segments located at both the ends of the serial core segment assembly into contact with each other.

A method of manufacturing a core for rotary electric machines, according to a twenty-second aspect of the present invention, includes forming a plurality of core segments by laminating core division sheets on which tees are formed, forming a serial core segment assembly by coupling adjacent core segments with one another, mounting an insulator made of resin on each core segment of the serial core segment assembly, bending the serial core segment assembly into an annular form so that yokes of all adjacent core segments are brought into contact with one another, forming a magnetic circuit by bringing yokes of core segments located at both ends of the serial core segment assembly into contact with each other, and coupling both the ends of the serial core segment assembly by welding the insulators located at both the ends of the serial core segment assembly.

A method of manufacturing a core for rotary electric machines, according to a twenty-third aspect of the present invention, includes forcibly expanding a concavity which is formed at one end of the serial core segment assembly and couple both ends of the serial core segment assembly by applying a pressure to outside the forcibly expanded concavity after a convexity formed on the other end of the serial core segment assembly is inserted into the forcibly expanded concavity in a radial direction of the serial core segment assembly bent in the annular form.

BRIEF DESCRIPTION OF THE DRAWINGS

FIGS. 1(a) through 1(d) are diagrams illustrating steps of a first embodiment of the manufacturing method according to the present invention;

FIGS. 8(a) through 8(d) are diagrams illustrating steps for coupling in a fifth embodiment of the present invention;

FIGS. 10(a) and 10(b) are diagrams illustrating main members in the sixth embodiment;

FIGS. 11(a) and 11(b) are diagrams illustrating steps for coupling both ends of a serial core segment assembly in a seven the embodiment of the present invention;

FIGS. 13(a) and 13(b) are diagrams illustrating steps for coupling both ends of a serial core segment assembly in a ninth embodiment of the present invention;

FIGS. 20(a) through 20(d) are diagrams illustrating steps of a conventional method of manufacturing a core.

DESCRIPTION OF THE EMBODIMENTS

The manufacturing method according to the present invention will now be described with reference to the embodiments illustrated in FIGS. 1(a) through 19.

First Embodiment

FIGS. 1(a) through 4(b) illustrate the first embodiment of the present invention. The first embodiment is a manufacturing method of a stator core which has 24 slots.

Figure 2A:
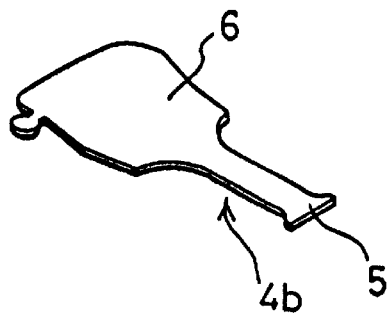
FIGS. 2(a) through 2(d) are diagrams descriptive of core segments to be located at ends of a serial core segment assembly in the first embodiment.
Figure 2C:
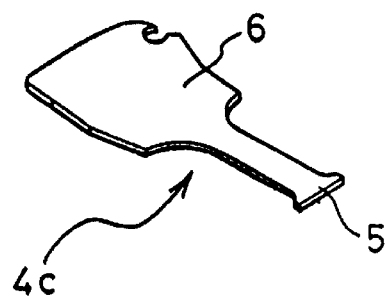

First, a first core division sheet 4a shown in FIG. 1(a), and second and third core division sheets 4b and 4c shown in FIGS. 2(a) and 2(c) are formed by punching a magnetic steel plate by press working. Reference numeral 5 represents a tee which is to be used as an electrode. Sides of the core division sheets 4a through 4c, which later constitute yokes, have an angle α set in accordance with a finished form of the 24 slots.

By laminating the first core division sheet 4a in a number required for obtaining thickness of a core in a finished form, 22 core segments 7a are formed in the first embodiment. By laminating the division core sheets 4a as described above, a concavity 8a is formed in one end surface of the yoke 6 over the entire region in the laminated direction and a convexity 8b is formed in the other end surface of the yoke 6 over the entire region in the laminated direction at a location corresponding to the concavity 8a.

Figure 2B:
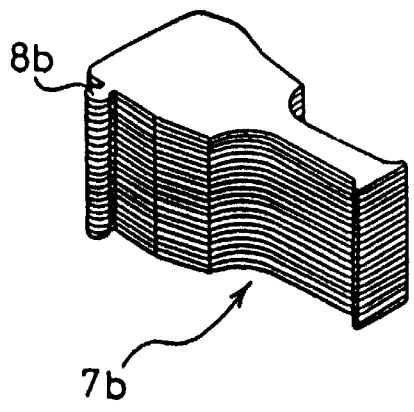

Similarly, a core segment 7b shown in FIG. 2(b) is formed by laminating the second core division sheet 4b in a required number described above. The core segment 7b has the convexity 8b formed in one end surface of the yoke 6 over the entire region in the laminated direction but does not have the concavity 8a in the other end surface unlike the core segment 7a.

Figure 2D:
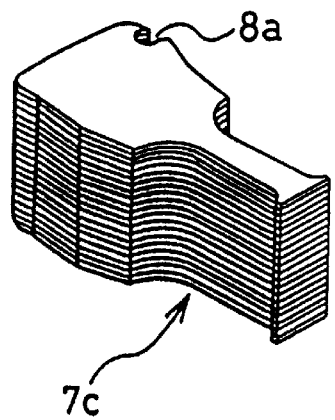

Similarly, a core segment 7c shown in FIG. 2(d) is formed by laminating the third core division sheet 4c in the required number described above. The core segment 7c has the concavity 8a formed in one end surface the yoke 6 over an entire region in the laminated direction, but does not have the convexity 8b in the other end surface of the yoke 6 unlike the core segment 7a.

Then, a serial core segment assembly 9 is formed by connecting 22 core segments 7a in series as shown in FIG. 1(c), and coupling the core segment 7b and the core segment 7c with both ends of the core segments 7a.

Two adjacent core segments are engaged by inserting or sliding the convexity 8b of one core segment into the concavity 8a of the other core segment, as shown in FIG. 20(c). As coupling portions in the first embodiment, a round tip is formed at a tip of the convexity 8b and a protrusion 10 is formed on a portion of the yoke located on the side of the tee so that the concavity 8a engages with an outer circumference of the tip of the convexity 8b at an angle exceeding 180 degrees. Further, a slant portion 11 having an angle corresponding to the protrusion 10 is formed on the yoke at the root of the convexity 8b on the side of the tee. When the serial core segment assembly 9, formed as described above, is bent so as to locate the tees 5 inside, the coupling portions rotate smoothly around the tips of the convexities 8b and an annular magnetic circuit is formed as shown in FIG. 1(d) by bringing the yokes of the core segment 7b and the core segment 7c into contact with each other.

Figure 3:
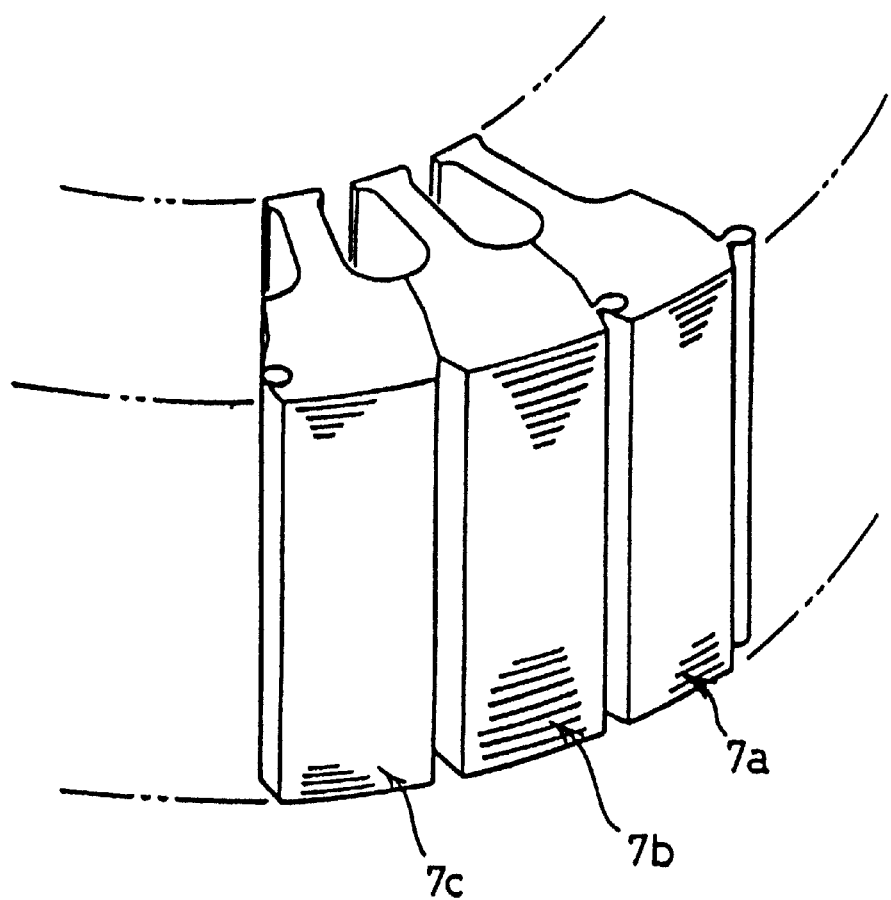
FIG. 3 is a perspective view of a coupled portion of both ends of the serial core segment assembly in the first embodiment.
Figure 4A:
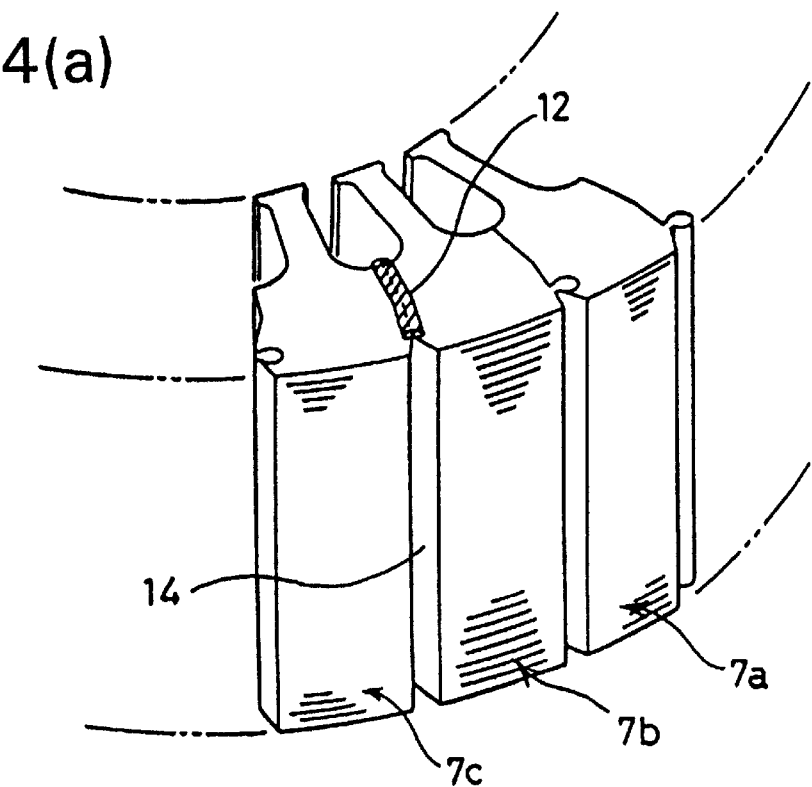
FIGS. 4(a) and 4(b) are perspective views illustrating a method to couple both the ends of the serial core segment assembly and concrete shapes of contact surfaces in the first embodiment.

FIG. 3 shows details of a location where the core segment 7b and the core segment 7c are brought into contact with each other. At this location, the core segment 7b and the core segment 7c are coupled to each other by welding end surfaces as shown in FIG. 4(a). Reference numeral 12 represents a welded location.

Figure 4B:
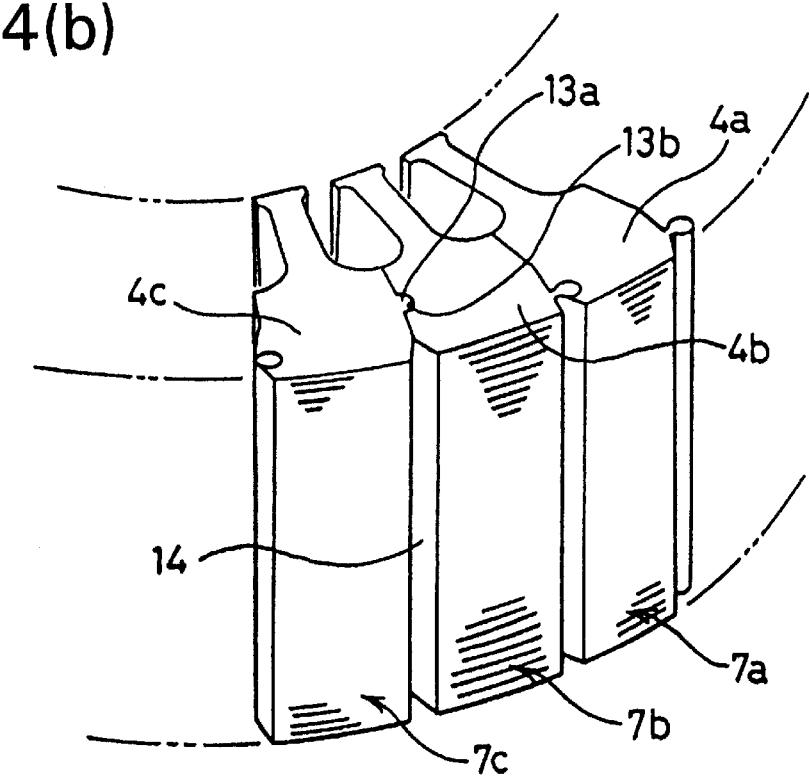

For more precisely positioning the core segment 7b to the core segment 7c when the serial core segment assembly is bent into an annular form, it is desirable to preliminarily form a positioning protrusion 13a on the yoke of either the second or third core division sheet 4b or 4c and a receiving concavity 13b for engagement with the protrusion 13a in the other core division segment as shown in FIG. 4(b).

Although the end surfaces of the core segments 7b and the core segment 7c are welded for coupling the core segment 7b and the core segment 7c with each other in the first embodiment described above, the portions which are brought into contact with each other can be fixed by welding an outer circumferences 14 of these portions without welding the end surfaces.

In the first embodiment which is configured as described above, the core segment 7b and the core segment 7c can be coupled with an inserting force which is weaker than that conventionally required since the core segment 7b slides in the laminated direction while causing friction only between an inner circumferential surface of the concavity 8a and an outer circumference of the tip of the convexity 8b, and almost all portions of the yokes are free from friction at the stage to couple the core segments 7a, 7b and 7c.

Further, the serial core segment assembly 9 can be bent into a cylindrical form with a weak force since the coupling portions are rotate smoothly around the tips of the convexities 8b at the stage to bend the serial core segment assembly into the annular form. Furthermore, favorable yokes having a low magnetic resistance can be located close to the roots of the tees 5 and a stator core having a favorable magnetic characteristic can be obtained, since the core segments are coupled to one another with the coupling portions formed on the portions which are to form an outer circumference when the magnetic circuit is formed by bending the serial core segment assembly 9 into the annular form.

While comparing the first embodiment of the preferred manufacturing method, with the conventional manufacturing method, description will be made of the excellence in winding work of the manufacturing method according to the first embodiment.

After a stator core has been finished in the cylindrical form, wires are continuously wound while passing them through slight gaps between tips of the tees 5. However, workability is low when the wires are wound while passing them through the gaps between the tips of the tees.

The conventional manufacturing method described with reference to FIG. 20 permits winding wires without passing them through the slight gaps between tips of the tees when the wires are wound around the tees 5 of each core segment 2 in the condition shown in FIG. 20(b) where the core segments have not been coupled yet and terminal treatment is carried out for serial connection of the wires wound separately around the tees 5 after the core is finished in the cylindrical form shown in FIG. 20(d).

The first embodiment of the preferred manufacturing method, which is configured to wind a wire continuously around the tees 5 in the condition of the serial core segment assembly and form the magnetic circuit by bending the serial core segment assembly having the wound wire into the annular form, not only permits winding the wire without passing it through the gaps between the tips of the tees of the stator core finished in the annular form as shown in FIG. 1(d) but also requires no tedious terminal treatment unlike the conventional manufacturing method, thereby assuring favorable winding workability.

Further, the first embodiment of the preferred manufacturing method, allows slot openings to be reduced, thereby capable of enhancing an effective magnetic flux and lowering cogging torques of motors having permanent magnets.

Though description has been made of the first embodiment taking the stator core which has the 24 tees as an example, the manufacturing method is applicable also to stator cores which have tees (slots) in different numbers.

Second Embodiment

Figure 5A:
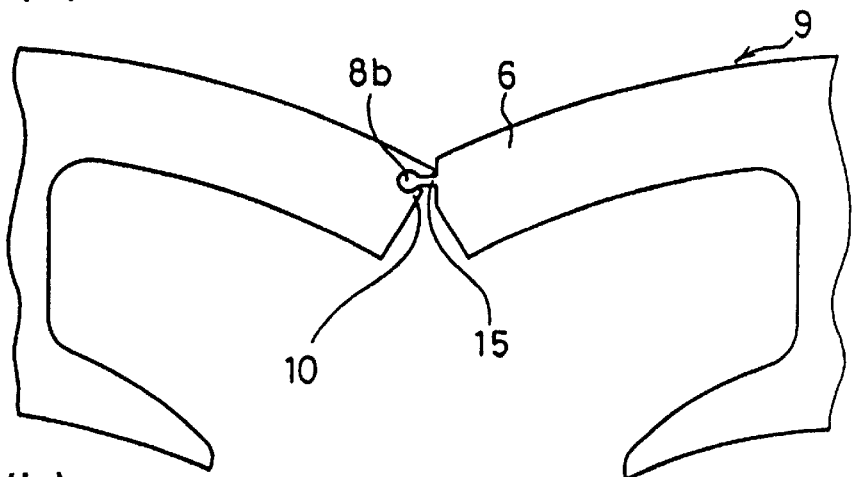
FIGS. 5(a) through 5(c) are diagrams illustrating steps for coupling in a second embodiment of the present invention.
Figure 5B:
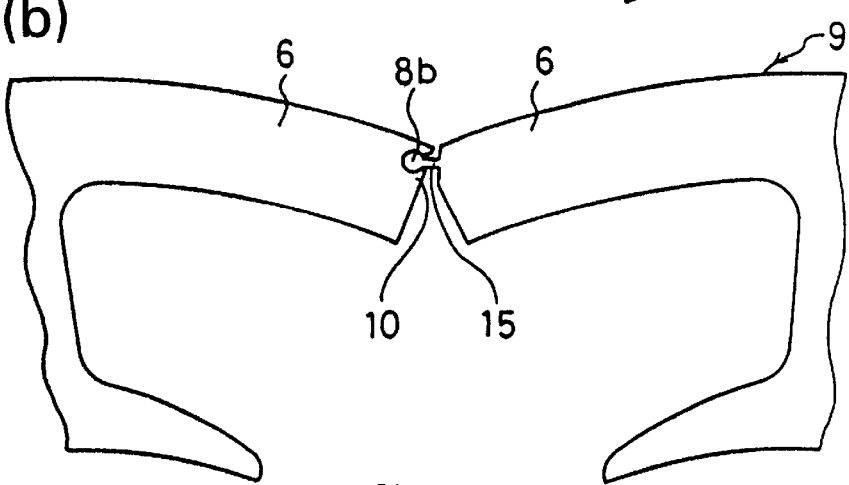
Figure 5C:
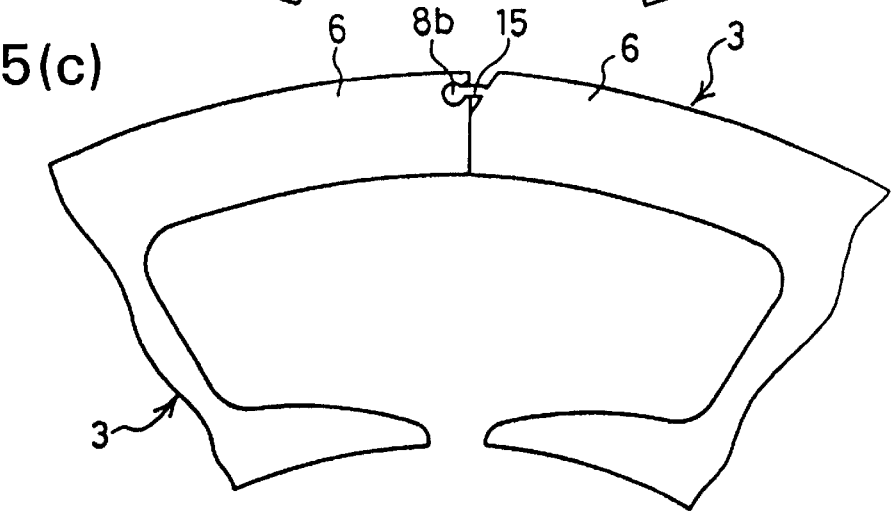

FIGS. 5(a) through 5(c) show the second embodiment of the present invention. Though the convexities 8b are not plastically deformed at the stage to form the cylindrical stator core by bending the serial core segment assembly 9 into the annular form in the first embodiment, convexities are partially deformed plastically in the second embodiment. FIGS. 5(a) through 5(c) exemplify a stator core which has 6 slots.

FIG. 5(a) illustrates a condition immediately after core segments are coupled in series. The core segments smoothly rotate around a tip of the convexity 8b and the convexity 8b is not plastically deformed at an initial stage to bend the serial core segment assembly 9 into the annular form but, once a tip of a protrusion 10 is brought into contact with an arm 15 which connects a tip of the convexity 8b to a yoke 6, subsequent bending causes plastic deformation of the arm as shown in FIG. 5(c) to finish a stator core 3 in a cylindrical form. In the other respects, the second embodiment remains unchanged from the first embodiment.

Third Embodiment

Figure 6A:
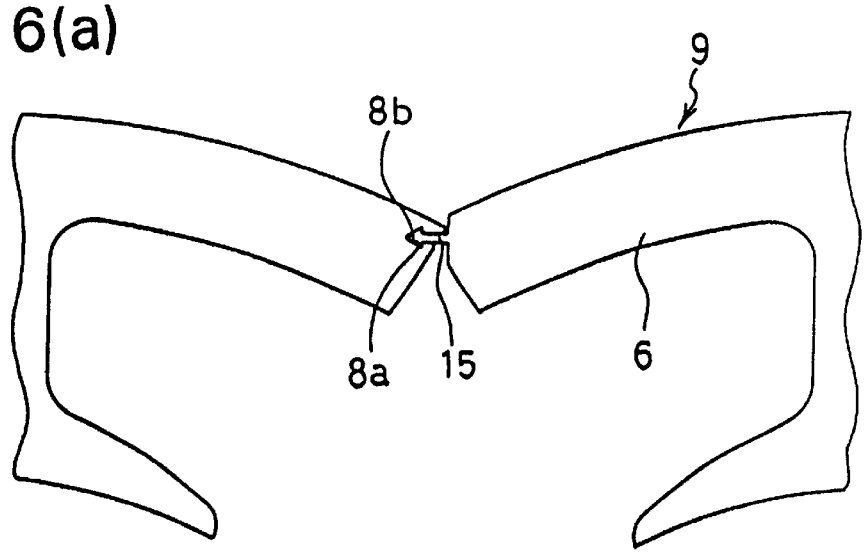
FIGS. 6(a) and 6(b) are diagrams illustrating steps for coupling in a third embodiment of the present invention.
Figure 6B:
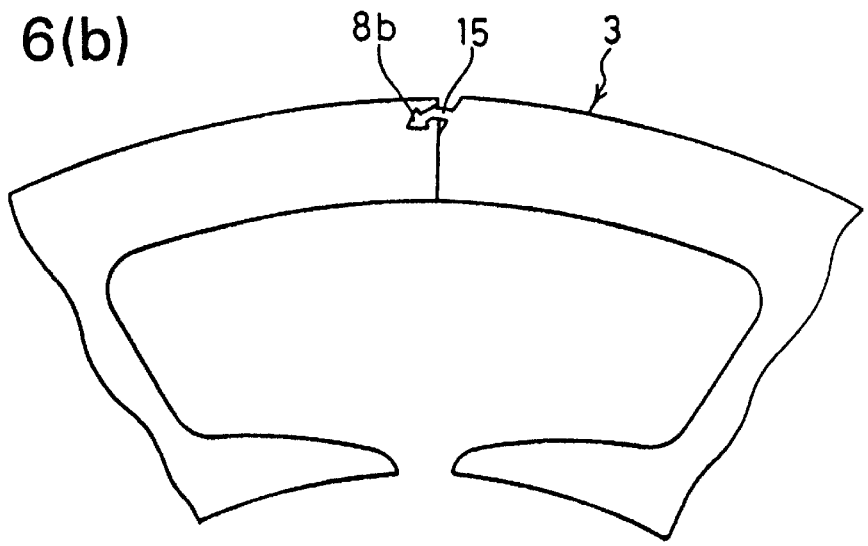

FIGS. 6(a) and 6(b) illustrate the third embodiment of the present invention. Though the convexities 8b are not plastically deformed at the stage to form the cylindrical stator core by bending the serial core segment assembly 9 into the annular form in the first embodiment, convexities are partially deformed plastically in the third embodiment. FIGS. 6(a) and 6(b) exemplify a stator core which has 6 slots.

FIG. 6(a) shows a condition immediately after core segments are coupled in series wherein a convexity 8b having a triangular tip is engaged with a concavity 8a formed in an adjacent core segment.

When starting bending of a core segment assembly 9 into an annular form, an arm 15 which connects the tip of the convexity 8b to a yoke 6 is plastically deformed as shown in FIG. 6(b) to finish a stator core in a cylindrical form.

The third embodiment remains unchanged from the first embodiment in the other respects.

The tip of the convexity 8b may not be triangular and can have another shape which does not permit rotation thereof, concretely rectangular or elliptical shape.

Fourth Embodiment

Figure 7A:
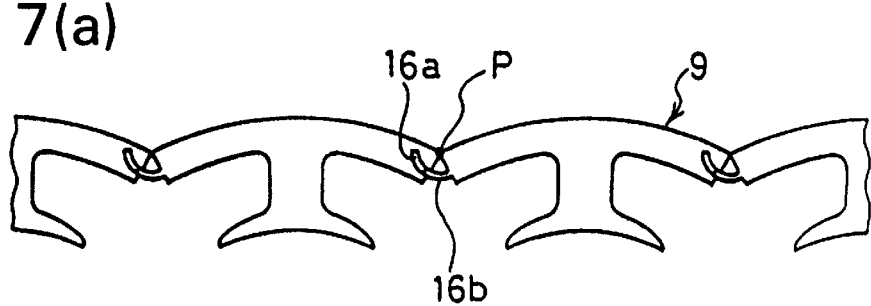
FIGS. 7(a) and 7(b) are diagrams illustrating steps for coupling in a forth embodiment of the present invention.
Figure 7B:
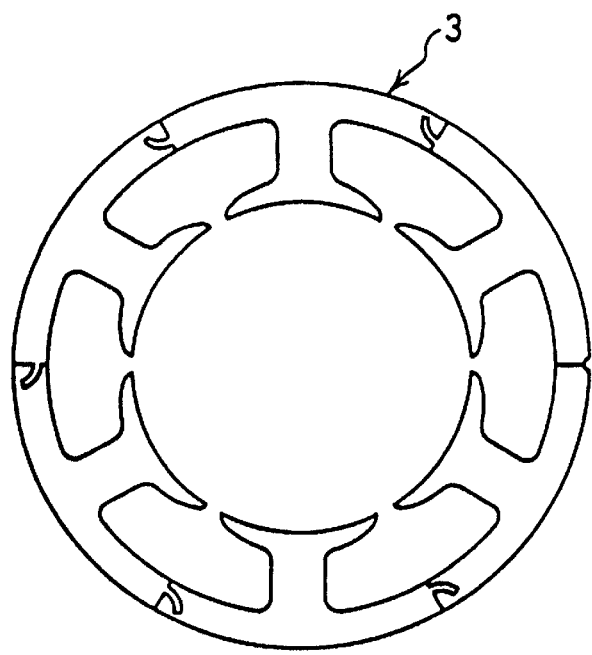

FIGS. 7(a) and 7(b) show the fourth embodiment of the present invention. In contrast to the first embodiment described above while exemplifying core division sheets on which the convexities having round tips are formed, the fourth embodiment is configured to form, as a convexity 8b, an integral arm 16b which has an arc shape around an angle P of an outer circumference from a portion constituting a yoke of a core division sheet to a tip. As the concavity 8a corresponding to this arm 16b, an arc-shaped notch 16a is formed around the angle P of the outer circumference.

When starting to bend a serial core segment assembly 9 into an annular form, the arc-shaped arm 16b is pressed or inserted into the arc-shaped notch 16a and a cylindrical stator core is finished as shown in FIG. 7(b). The fourth embodiment remains unchanged from the first embodiment in the other respects.

Fifth Embodiment

FIGS. 8(a) through 8(d) illustrate the fifth embodiment of the present invention. In contrast to the fourth embodiment wherein the arc-shaped arm 16b is formed integrally with the core division sheet as the convexity, the fifth embodiment is configured to form an arc-shaped arm 16b separately from a core division sheet 4.

As shown in FIG. 8(a), formed in the core division sheet 4 are an arm setting notch 17 at one end of a portion which is to constitute a yoke and an notch 16a having an arc shape around an angle P of an outer circumference.

A plurality of core segment bodies 70 are composed by laminating the core division sheet 4 in a required number as shown in FIG. 8(b). A core segment 7 is formed by fitting the separately formed arc-shaped arm member 16b into a groove 18 which is formed in the laminated direction by the arm setting notches formed in the core segment body 70 for setting the arm.

A serial core segment assembly 9 is composed by coupling the core segments 7 as shown in FIG. 8(c) and bent into an annular form to finish a cylindrical stator core as in the fourth embodiment.

Though the arc-shaped arm member 16b is formed by punching out arc-shaped magnetic steel plates and laminating these plates, this member can be formed not by laminating but by cutting it out as an integral lump. The fifth embodiment remains unchanged from the fourth embodiment in the other respects.

Sixth Embodiment

Figure 9A:
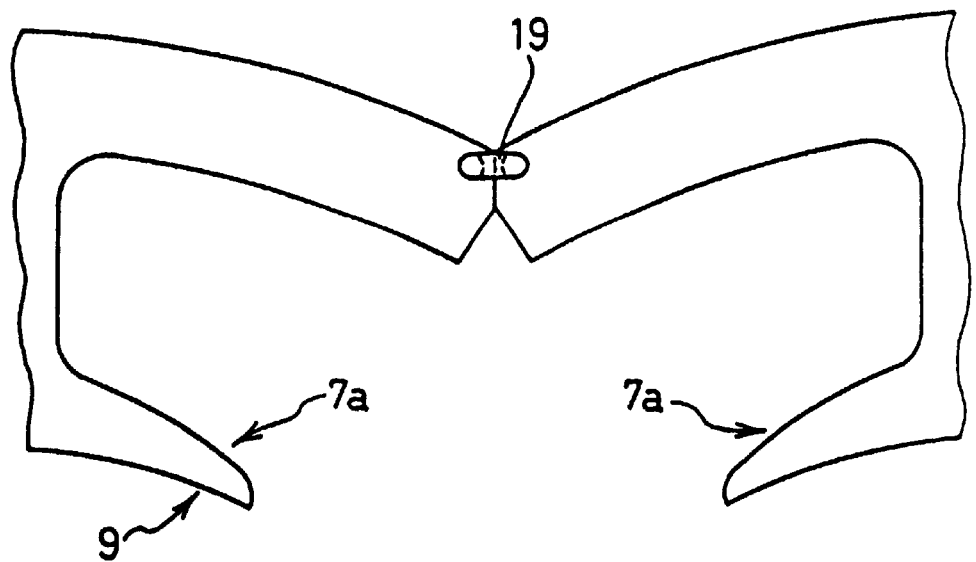
FIGS. 9(a) and 9(b) are diagrams illustrating steps for coupling in a sixth embodiment of the present invention.
Figure 9B:
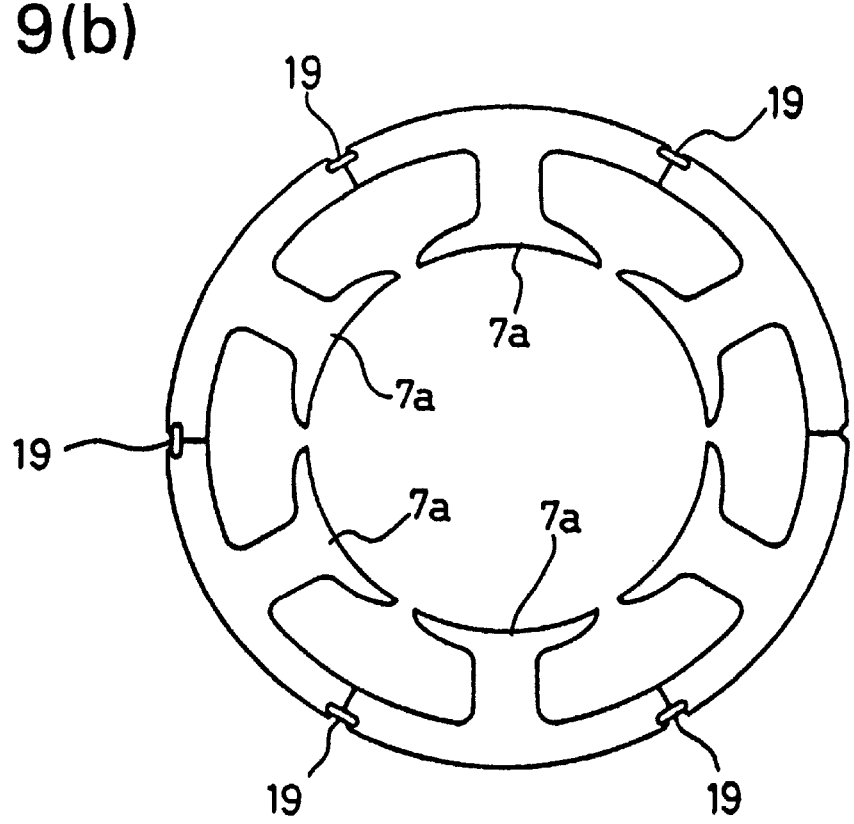

FIGS. 9(a) through 10(b) illustrate the sixth embodiment of the present invention. Though the coupling portions which couple the core segments to compose the serial core segment assembly are composed so as to engage the convexity 8b formed at one end of the yoke 6 of the core segment with the concavity 8a formed at the other end of the yoke 6 of the adjacent core segment in the first through fifth embodiments, the sixth embodiment is configured to compose a serial core segment assembly 9 by coupling adjacent core segments 7a with a pin 19 as shown in FIG. 9(a) and bend the serial core segment assembly 9 into an annular form, thereby bending the pin 19 so as to finish a stator core having a cylindrical form as shown in FIG. 9(b).

Speaking more concretely, holes 20 are formed at both ends of a portion which is to constitute a yoke of a core division sheet 4a as shown in FIG. 10(a) and a plurality of core segments 7a are composed by laminating the core division sheet 4a in a required number.

A serial core segment assembly 9 is composed by disposing the core segments 7a and inserting U-shaped pins into the holes 20 of adjacent core segments as shown in FIG. 10(b). When the serial core segment assembly 9 is bent into an annular form, the pins 19 are deformed to finish a cylindrical stator core 3 shown in FIG. 9(b).

Seventh Embodiment

FIGS. 11(a) and 11(b) show the seventh embodiment of the present invention. In contrast to the first embodiment through the sixth embodiment in each of which both the ends of the serial core segment assembly are coupled with each other by welding after the magnetic circuit is formed by bending the serial core segment assembly into the annular form and bringing the yokes of the core segments disposed at both the ends of the serial core segment assembly into contact with each other, the seventh embodiment is configured to couple both ends of a serial core segment assembly 9 by engaging a first engaging portion 21a formed at one end of the serial core segment assembly 9 with a second engaging portion 21b formed at the other end as shown in FIG. 11(b).

Eighth Embodiment

FIGS. 12(a) through 12(e) illustrate the eighth embodiment of the present invention.

Figure 12A:
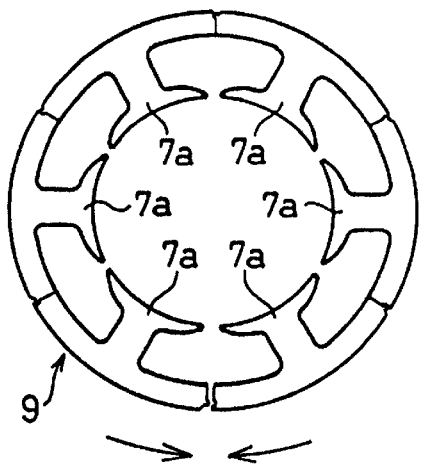
FIGS. 12(a) through 12(e) are diagrams illustrating steps for coupling both ends of a serial core segment assembly in an eighth embodiment of the present invention.
Figure 12B:
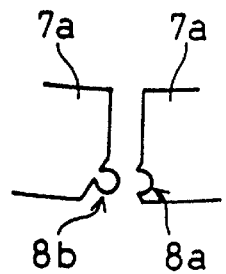
Figure 12C:
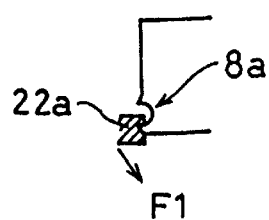
Figure 12D:
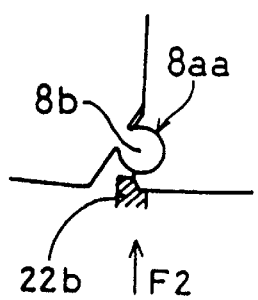
Figure 12E:
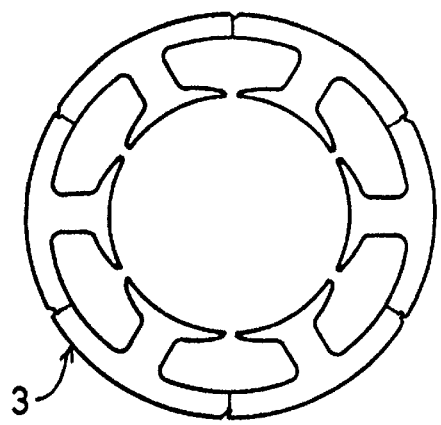

In contrast to the first embodiment through the sixth embodiment, wherein both the ends of the serial core segment assembly are coupled with each other by welding after the magnetic circuit is formed by bending the serial core segment assembly into the annular form and bringing the yokes of the core segments disposed at both the ends of the serial core segment assembly into contact with each other, the eighth embodiment is configured to form a serial core segment assembly 9 of core segments 7a which have the same shape as shown in FIGS. 12(a) and 12(b), form a magnetic circuit by bending the serial core segment assembly 9 into an annular form, and forcibly expand a concavity 8a formed at one end of the serial core segment assembly 9 with a jig 22a in a direction indicated by an arrow F1 as shown in FIG. 12(c). After a convexity 8b formed at the other end of the serial core segment assembly 9 is inserted in the radial direction into the serial core segment assembly 9 which is bent in the annular form and press a partial or entire width outside a forcibly expanded concavity 8aa with a jig 22b in the laminated direction of the core division sheets to shape a stator core 3 as shown in FIG. 12(e).

Though the eighth embodiment is configured to forcibly expand the concavity 8a formed at the one end of the serial core segment assembly 9 after the core segments 7a are composed into the serial core segment assembly 9, it is possible to expand the concavity 8a in each of the core segment 7a and then compose the serial core segment assembly 9.

Ninth Embodiment

FIGS. 13(a) and 13(b) illustrate the ninth embodiment.

In contrast to the first through sixth embodiment each of which both the ends of the serial core segment assembly are coupled by welding after the magnetic circuit is formed by bending the serial core segment assembly into the annular form and bringing the yokes of the core segments located at both the ends of the serial core segment assembly into contact with each other, the ninth embodiment is configured to form ends of core division sheets so as to form concavities 23a and convexities 23b which are alternately flush at both ends a serial core segment assembly 9 as shown in FIG. 13(a) and put one and of the serial core segment assembly into the other end for forming a cylindrical magnetic circuit as shown in FIG. 13(b).

Tenth Embodiment

Though both the ends of the serial core segment assembly are coupled with each other by welding after the magnetic circuit is formed by bending the serial core segment assembly is bent into the annular form and bringing the yokes of the core segments located at both the ends of the serial core segment assembly into contact with each other in each of the first embodiment through the sixth embodiment, it is possible to couple a serial core segment assembly into an annular form by inserting a U-shaped pin 19, which is similar to the pin 19 which is used for composing the serial core segment assembly 9 in the sixth embodiment, into a hole formed at one end of the serial core segment assembly and a hole formed at the other end.

Eleventh Embodiment

Figure 14A:
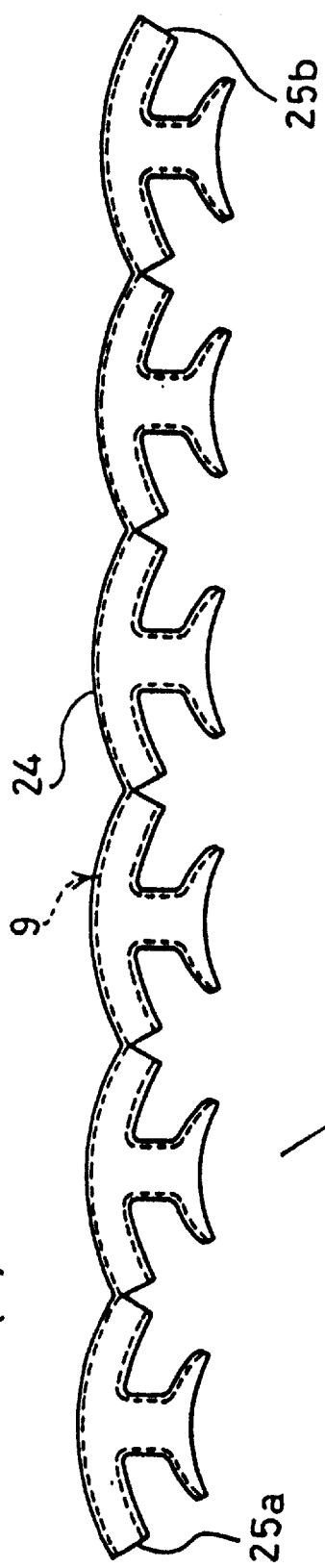
FIGS. 14(a) and 14(b) are diagrams illustrating steps for coupling both ends of a serial core segment assembly in an eleventh embodiment of the present invention.
Figure 14B:
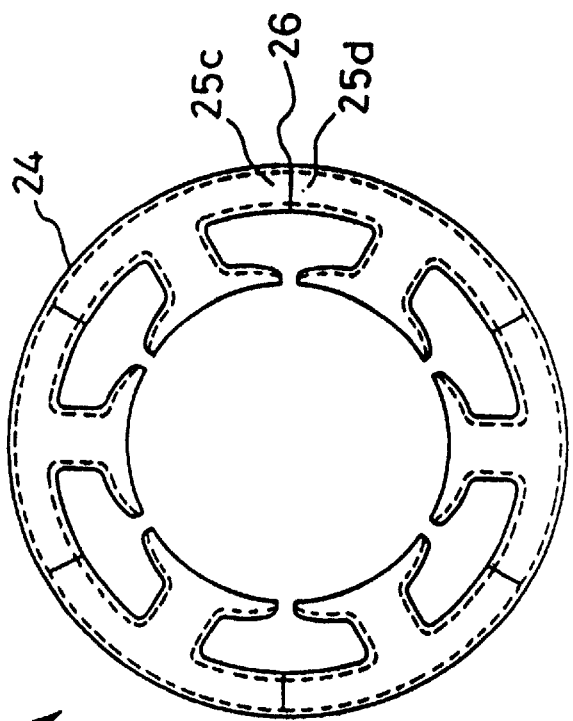

FIGS. 14(a) and 14(b) show the eleventh embodiment of the present invention. Though both the ends of the serial core segment assembly are coupled with each other by welding, engaging or inserting the U-shaped pin after the magnetic circuit is formed by bending the serial core segment assembly into the annular form and bringing the yokes of the core segments located at both the ends of the serial core segment assembly in each of the first embodiment through the tenth embodiment, the eleventh embodiment is configured to mold resin on surfaces of core segments of a serial core segment assembly 9, except end surfaces of yokes, as shown in FIG. 14(a), and form a magnetic circuit by bending a serial core segment assembly 9 into an annular form so that yokes of all adjacent core segments are brought into contact with one another as shown in FIG. 14(b) and bring yokes of core segments 25a and 25b located at both ends of the serial core segment assembly into contact with each other.

Both the end of the serial core segment assembly 9 which has been shaped into the annular form are coupled with each other by welding the material molded on an outer circumference 26 or end surfaces 25c and 25d with supersonic waves or similar means.

Twelfth Embodiment

Though the resin is molded selectively at the required locations after the serial core segment assembly is formed and both the ends thereof are coupled with each other by welding the molded material on both the ends of the serial core segment assembly after it is formed into the annular form in the eleventh embodiment, it is possible to mold resin on surfaces of core segments, except end surfaces of yokes, before they are coupled into a serial core segment assembly 9, form a serial core segment assembly 9 by coupling the core segments having the molded resin and couple both ends of the serial core segment assembly by welding the molded material at both the ends of the serial core segment assembly in the same manner as that in the eleventh embodiment.

Thirteenth Embodiment

Though the resin is molded selectively at the required locations after the serial core segment assembly is composed and both the ends of the serial core segment assembly are coupled with each other by welding after the serial core segment assembly is bent into the annular form in the eleventh embodiment, it is possible to couple both ends of a serial core segment assembly by molding resin on the serial core segment assembly which is bent into an annular form.

Fourteenth Embodiment

Figures 15A, 15B:
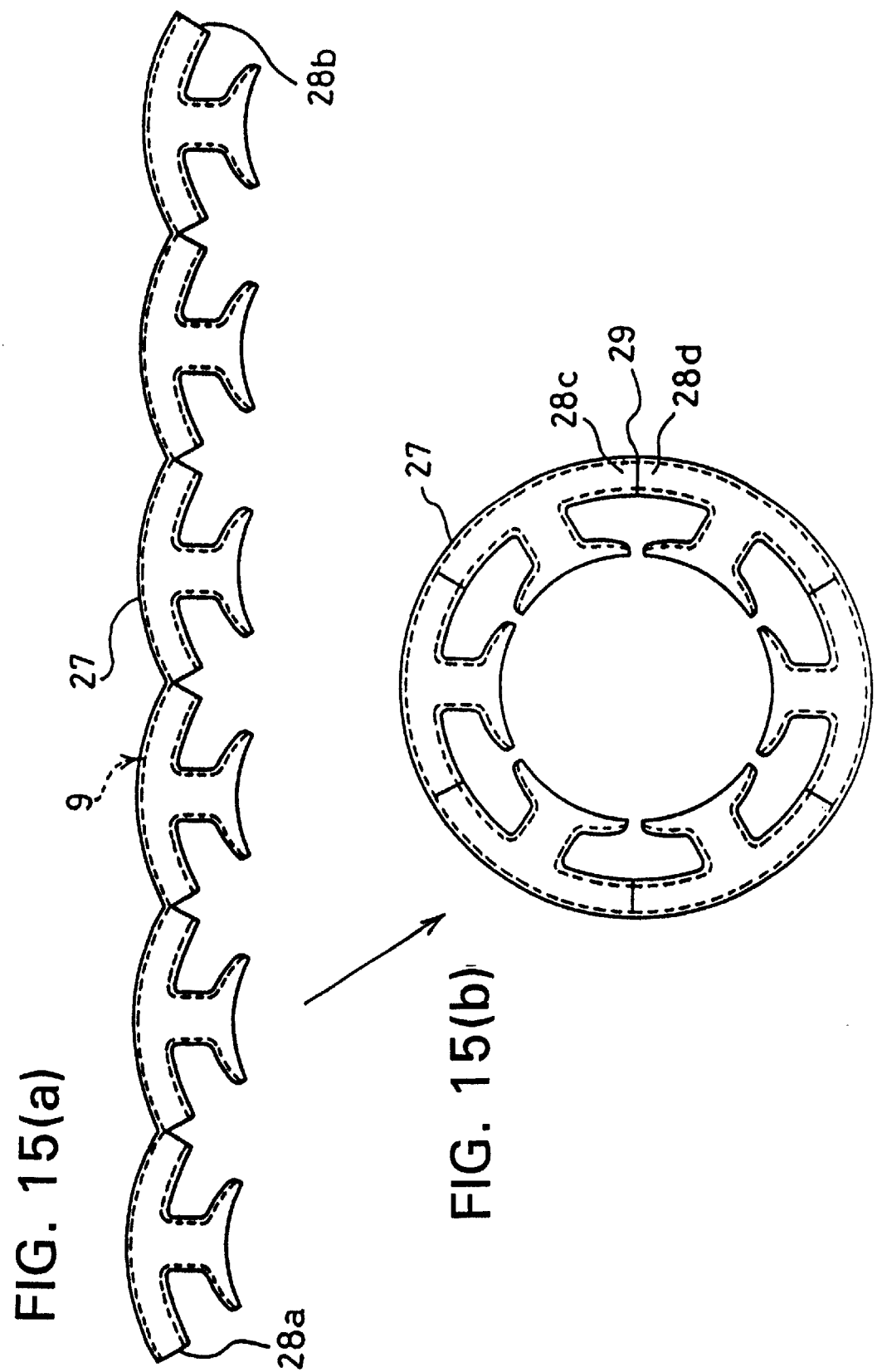
FIGS. 15(a) and 15(b) are diagrams illustrating steps for coupling both ends of a serial core segment assembly in a fourteenth embodiment of the present invention.
Figure 16:
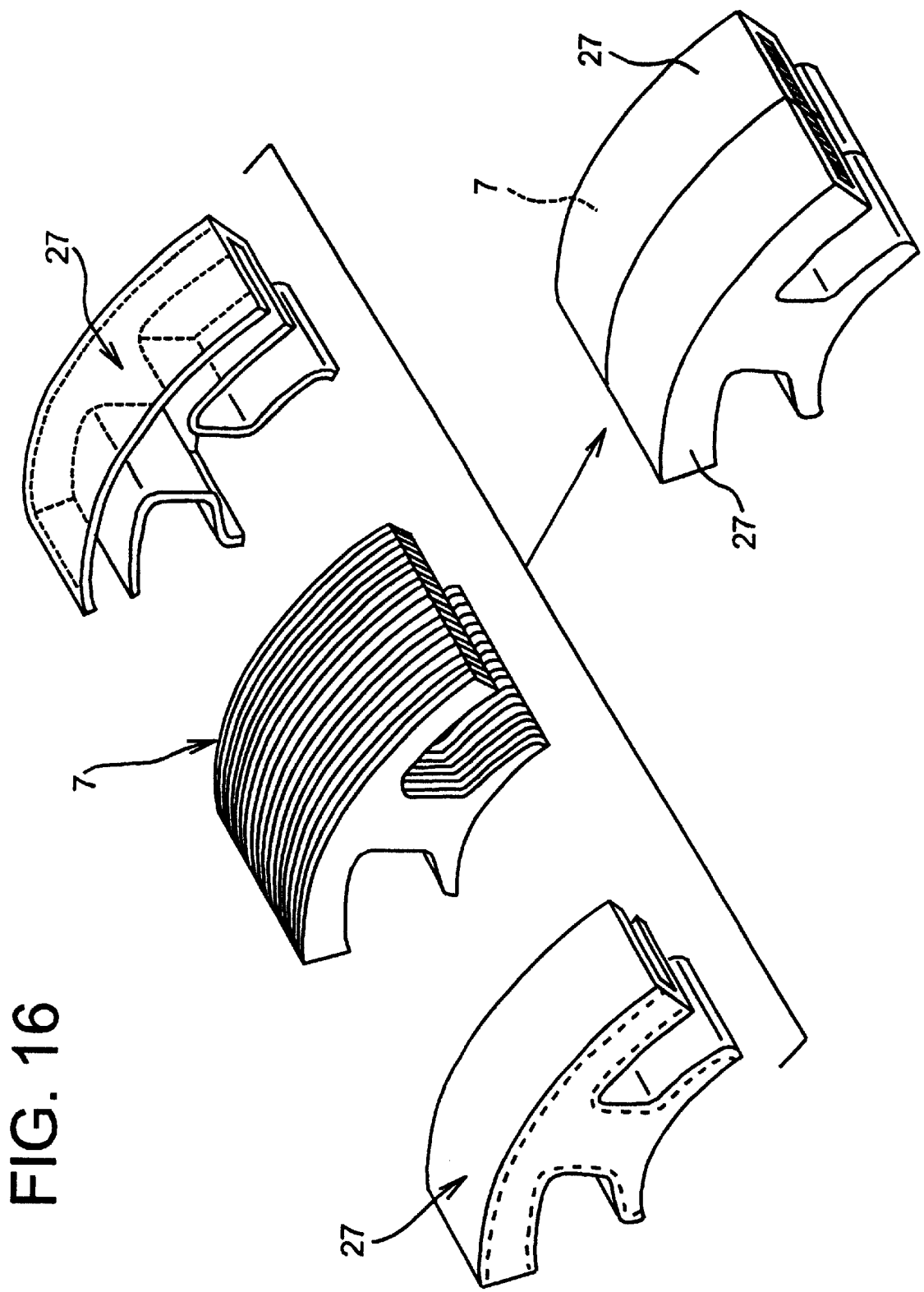
FIG. 16 is a diagram illustrating an appearance of an insulator and assembling steps therefor in the fourteenth embodiment.

FIGS. 15(a) through 16 show the fourteenth embodiment of the present invention.

Though both the ends of the serial core segment assembly are coupled with each other by welding the material molded on the core segments in each of the eleventh embodiment and the twelfth embodiment, the fourteenth embodiment is configured to prepare insulators 27, 27 made of resin as shown in FIG. 16, mount the insulator 27 on each of core segments of a serial core segment assembly 9 as shown in FIG. 15(a), bend the serial core segment assembly 9 into an annular form so that yokes of all adjacent core segments are brought into contact with one another as shown in FIG. 15(b) and form a magnetic circuit by bringing yokes at ends 28a and 28b of the insulators 27 located at both ends of the serial core segment assembly 9 into contact with each other.

Further, the insulators 27 located at both the ends of the serial core segment assembly 9 which is shaped into the annular form can be coupled with each other by welding an outer circumference or end surfaces 28c and 28d of the insulators 27 with ultrasonic waves or the like.

Though the insulators 27, 27 are mounted on each of the core segments 7 of the serial core segment assembly 9 in FIGS. 15(a) and 15(b), a magnetic circuit can similarly be formed by mounting the insulators 27, 27 on the core segments 7 as shown in FIG. 16, composing the serial core segment assembly 9 by coupling the core segments on which the insulators 27, 27 have been mounted, bending the serial core segment assembly 9 into an annular form so that yokes of all adjacent core segments are brought into contact with one another, and bringing the yokes of the core segments of the ends 28a and 28b of the insulators 27 located at both the ends of the serial core segment assembly into contact with each other.

Fifteenth Embodiment

Figure 17A:
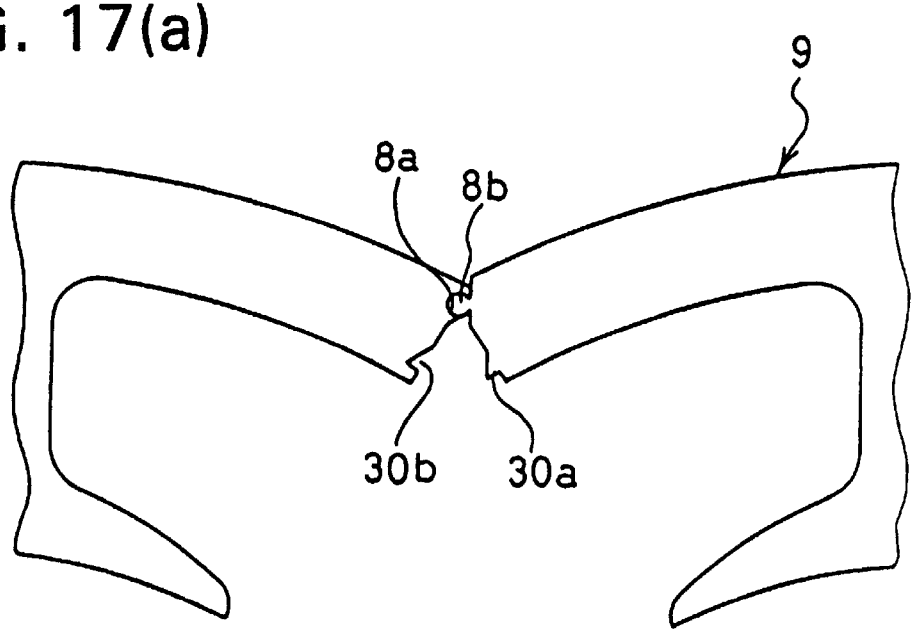
FIGS. 17(a) and 17(b) are diagrams illustrating coupling steps for a serial core segment assembly in a fifteenth embodiment of the present invention.
Figure 17B:
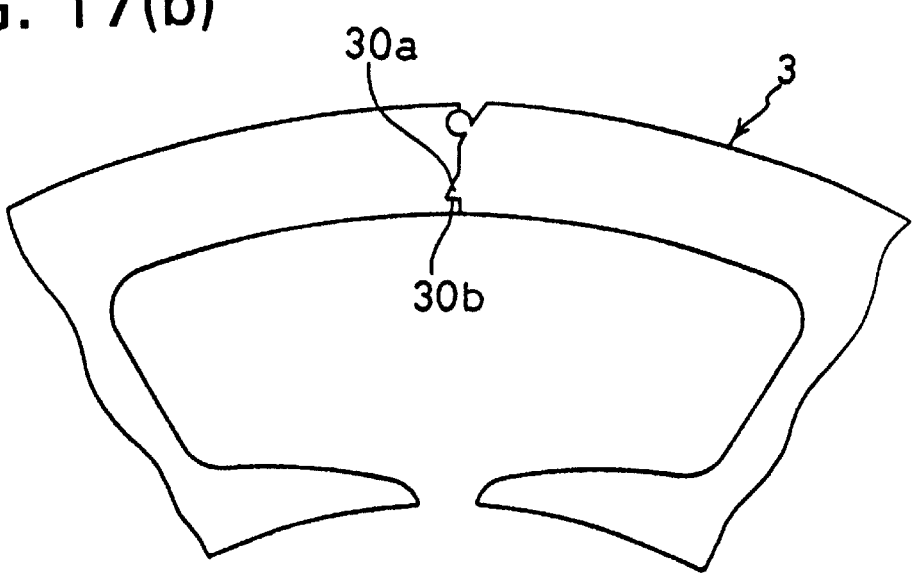

FIGS. 17(a) and 17(b) show the fifteenth embodiment of the present invention. Though the adjacent core segments are coupled by engaging the coupling concavities with the coupling convexities for composing the serial core segment assembly and the magnetic circuit is formed by bending the serial core segment assembly so that the yokes of the adjacent core segments are brought into contact with one another in each of the embodiments described above, it can be expected to enhance mechanical strength and precision of the annular form of a stator core by preliminarily forming an engaging protrusion 30a and an engaging concavity 30b at locations of a core division sheet 4a which are on a side of the tee of the yoke as shown in FIG. 17(a) so that the engaging protrusion 30a engages with the engaging concavity 30b as shown in FIG. 17(b) when the serial core segment assembly is bent into the annular form.

Sixteenth Embodiment

Figure 18A:
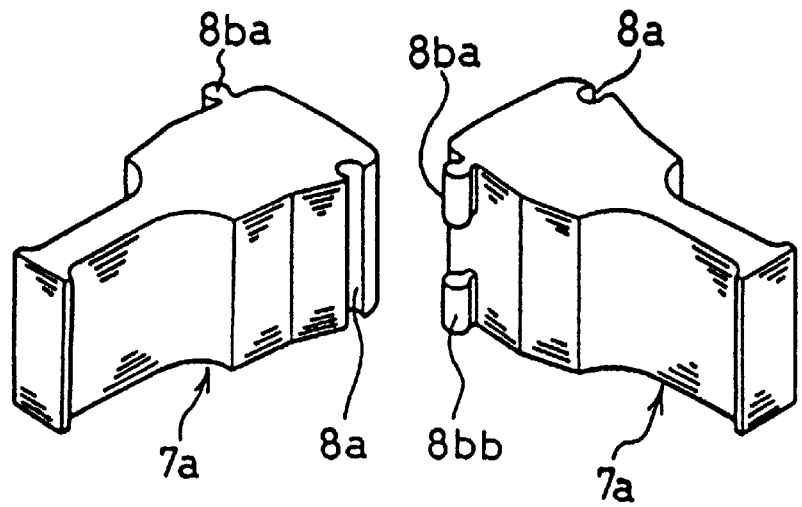
FIGS. 18(a) and 18(b) are perspective views illustrating coupling steps for a serial core segment assembly in a sixteenth embodiment of the present invention.
Figure 18B:
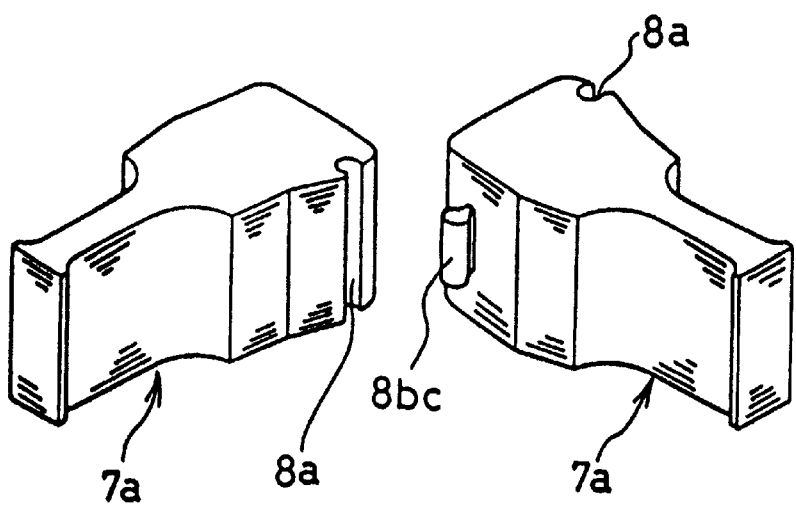

FIGS. 18(a) and 18(b) show the sixteenth embodiment of the present invention. Though the coupling portions for coupling the core segments are formed as the concavity formed at one end of the yoke of the core segment over the entire width in the laminated direction and the convexity formed at the other end of the yoke of the core segment over the entire width in the laminated direction in each of the embodiments described above, a similar effect can be obtained by forming the similar coupling portions on end surfaces of partially in the laminated direction of the core division sheets.

Such an effect can be obtained by preparing and laminating core division sheets so as to form a concavity 8a at one end of a yoke of a core segment 7a over the entire width as shown in FIG. 18(a), and convexities 8ba and 8bb at the other end of the yoke of the core segment 7a in the laminated direction except a middle portion thereof as shown in FIG. 18(a) or preparing and laminating core division sheets so as to form a concavity 8a at one end of a yoke of a core segment 7a over the entire width in the laminated direction and a convexity 8bc at the other end of the yoke of the core segment 7a at a middle location in the laminated direction as shown in FIG. 18(b).

By forming such coupling portions for coupling adjacent core segments with each other partially on end surfaces of core segments, it is possible to further reduce friction to be produced by inserting the convexity 8b into the concavity 8a.

Figure 19:
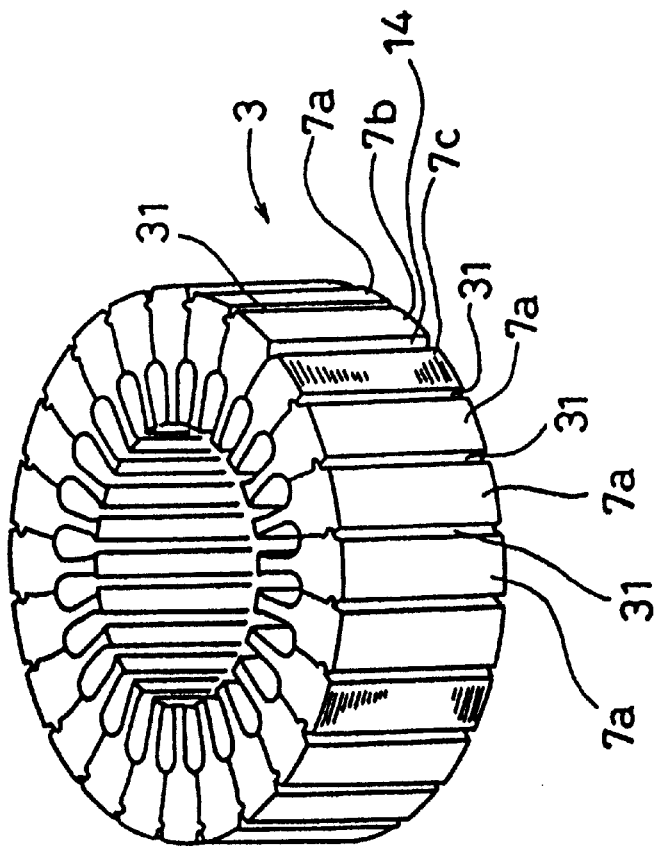
FIG. 19 is a perspective view illustrating coupled portions of a serial core segment assembly in a seventeenth embodiment of the present invention.

Seventeenth Embodiment FIG. 19 shows the seventeenth embodiment of the present invention. Though the core segments 7a—7a, 7a-7b and 7a-7c are coupled with one another by the engagement, press fitting, insertion or use of the U-shaped pins in each of the first embodiment through the sixth embodiment, the seventeenth embodiment is configured to weld outer circumferences 31 of coupling portions partially or over the entire width in a condition where a serial core segment assembly is bent in an annular form as shown in FIG. 19.

It can be expected that the welding enhances mechanical strength of a stator core 3 and precision of the annular form thereof.

Though one tee is formed on a core division sheet in the embodiments described above, the similar effects may be obtained by forming a plurality of tees on one core division sheet, composing core segments by laminating such core division sheets and composing a serial core segment assembly by coupling the core segments and bending the serial core segment assembly into an annular form to finish a cylindrical stator core.

As is clear from the embodiments described above, configurations defined by claims of the present invention provide particular effects which are mentioned below:

The method of manufacturing a core for rotary electric machines, according to a first aspect of the present invention, permits forming a cylindrical core of core division sheets, thereby providing a favorable blanking yield. Further, this method is configured to bend a serial core segment assembly after it is composed by coupling core segments and permits coupling the core segments in a condition where yokes of adjacent core segments are free from friction, thereby assuring a high workability at the stage to couple the core segments. Furthermore, the method facilitates to bring the yokes of the adjacent core segments into close contact so as to remain no gap, thereby permitting lowering magnetic reluctance and obtaining a favorable magnetic characteristic.

Moreover, the method permits continuously winding a wire around tees of the serial core segment assembly and then bending the serial core segment assembly into an annular form, thereby providing an assembling workability higher than that obtained in a case where wires are wound independently around tees of a core finished in a cylindrical form and the wires are connected in series by terminal treatments of the wires.

The method of manufacturing a core for rotary electric machines, according to a second aspect of the present invention, permits locating favorable yokes having a low magnetic reluctance close to roots of tees, thereby making it possible to obtain a stator core having a favorable magnetic characteristic.

The method of manufacturing a core for rotary electric machines, according to a third aspect of the present invention, permits stably maintaining a cylindrical form obtained by bending a serial core segment assembly into an annular form, thereby facilitating to handle the core in a stage to build it into a frame of a rotary electric machine.

The method of manufacturing a core for rotary electric machines, according to a fourth aspect of the present invention, permits stably maintaining a cylindrical form obtained by bending a serial core segment assembly into an annular form, thereby facilitating to handle the core at a stage to build it into a frame of a rotary electric machine.

The method of manufacturing a core for rotary electric machines, according to a fifth aspect of the present invention, permits stably maintaining a cylindrical form obtained by bending a serial core segment assembly into an annular form, thereby facilitating to handle the core at a stage to build it into a frame of a rotary electric machine. Further, this method allows both ends of the serial core segment assembly bent in the annular form to be coupled with each other by utilizing a molding material.

The method of manufacturing a core for rotary electric machines, according to a sixth aspect of the present invention, permits stably maintaining a cylindrical form obtained by bending a serial core segment assembly into an annular form, thereby facilitating to handle the core at a stage to build it into a frame of a rotary electric machine. Further, this method allows both ends of the serial core segment assembly bent into an annular form to be coupled with each other by utilizing a molding material.

The method of manufacturing a core for rotary electric machines, according to a seventh aspect of the present invention, permits stably maintaining a cylindrical form obtained by bending a serial core segment assembly into an annular form, thereby facilitating to handle the core at a stage to assemble it into a frame of a rotary electric machine.

Further, this method allows both ends of the serial core segment assembly bent into an annular form to be coupled with each other by utilizing a molding material.

The method of manufacturing a core for rotary electric machines, according to an eighth aspect of the present invention, permits stably maintaining a cylindrical form obtained by bending a serial core segment assembly into an annular form, thereby facilitating to handle the core at a stage to assemble it into a frame of a rotary electric machine.

The method of manufacturing a core for rotary electric machines, according to a ninth aspect of the present invention, coupling both ends of a serial core segment assembly with each other simply by slightly changing shapes of core segments located at both the ends of the serial core segment assembly, thereby facilitating to handle the core at a stage to assemble it into a frame of a rotary electric machine.

The method of manufacturing a core for rotary electric machines, according to a tenth aspect, allows both ends of a serial core segment assembly with each other simply by slightly changing manufactured lengths of yokes of core division sheets of core segments located at both the ends of the serial core segment assembly, thereby facilitating to handle the core at a stage to build it into a frame of a rotary electric machine.

The core for rotary electric machines, according to an eleventh aspect of the present invention, consists of a serial core segment assembly which is composed of core segments composed by laminating core division sheets having the same shape.

The core for rotary electric machines, according to a twelfth aspect of the present invention, permits weakening an inserting force for coupling core segments though it requires forming and laminating core division sheets which have several kinds of shapes.

The core for rotary electric machines, according to a thirteenth aspect of the present invention, is composed of core segments which have no distinction between front and rear surfaces or can be coupled in any direction, thereby featuring a high workability.

The method of manufacturing a core for rotary electric machines, according to a fourteenth aspect allows core segments to be rotated smoothly around tips of coupling convexities at a stage to bend a serial core segment assembly into an annular form, thereby shaping it into a cylindrical form with a slight force.

The method of manufacturing a core for rotary electric machines, according to a fifteenth, allows a serial core segment assembly to be bent into an annular form or shaped into a cylindrical form with a slight force required for plastic deformation of arms and facilitates to maintain the serial core segment assembly in the annular form owing to the plastic deformation of the arms.

The method of manufacturing a core for rotary electric machines, according to a sixteenth aspect of the present invention, allows a serial core segment assembly to be bent into an annular form or shaped into a cylindrical form with a slight force required for plastic deformation of arms and facilitates to maintain the serial core segment assembly in the annular form owing to the plastic deformation of the arms.

The method of manufacturing a core for rotary electric machines, according to a seventeenth aspect of the present invention, allows a serial core segment assembly to be bent into an annular form or shaped into a cylindrical form with a slight force required for pressing or inserting coupling convexities toward depth of coupling concavities.

The method of manufacturing a core for rotary electric machines, according to an eighteenth aspect of the present invention, includes coupling adjacent core segments with each other using a coupling pin and requires only formation of holes in the core segments for inserting the pin, thereby facilitating to manufacture the core segments as compared with core segments which have coupling concavities and convexities formed on outer circumferences thereof.

The method of manufacturing a core for rotary electric machines, according to a nineteenth aspect of the present invention, requires only formation of holes for inserting coupling pins into core segments to be located at both ends of a serial core segment assembly, thereby facilitating to manufacture the core segments as compared with core segments which have coupling concavities and convexities formed on outer circumferences thereof.

The method of manufacturing a core for rotary electric machines, according to a twentieth aspect of the present invention, includes continuously winding a wire before a serial core segment assembly is bent into an annular form, thereby facilitating a winding work.

The method of manufacturing a core for rotary electric machines, according to a twenty-first aspect of the present invention, it possible to expect to enhance mechanical strength of a stator core and precision of an annular form thereof when a serial core segment assembly is bent into the annular form or finished in a cylindrical form.

The method of manufacturing a core for rotary electric machines, according to a twenty-second aspect of the present invention, permits stably maintaining a cylindrical form which is obtained by bending a serial core segment assembly into an annular form and facilitate to handle a core at a stage to assemble it into a frame of a rotary electric machine. Further, this method permits both ends of a serial core segment assembly bent in an annular form to be coupled with each other by utilizing an insulator material.

The method of manufacturing a core for rotary electric machines, according to a twenty-third aspect of the present invention, permits composing a cylindrical stator core only of core segments which have the same shape.

What is claimed is:

1. A method of manufacturing a core for rotary electric machines, comprising:

forming a plurality of core segments by laminating core division sheets having tees; and obtaining a magnetic circuit by forming a serial core segment assembly by coupling adjacent core segments with one another, bending the serial core segment assembly into an annular form so that yokes of all the adjacent core segments are brought into contact with one another and the yokes of core segments located at both ends of the serial core segment assembly contact each other;

wherein a coupling convexity formed on one of the core segments and including a generally planar arc-like tip rotatably engages an adjacent core segment by more than 180 degrees so that an arm connecting a root to a tip of a convexity for coupling the core segments does not deform when forming the serial core segment assembly by engaging a coupling convexity formed on one of the core segments with an adjacent core segment, and when forming the magnetic circuit by bending the serial core segment assembly into an annular form.

2. A method of manufacturing a core for rotary electric machines, comprising:

forming a plurality of core segments by laminating core division sheets having tees; and obtaining a magnetic circuit by forming a serial core segment assembly by coupling adjacent core segments with one another, bending the serial core segment assembly into an annular form so that yokes of all the adjacent core segments contact one another and the yokes of core segments located at both ends of the serial core segment assembly contact each other;

wherein a coupling convexity formed on one of the core segments and including an arc-like generally planar tip rotatably engages an adjacent core segment within a defined range of more than 180 degrees to allow an arm connecting a root to a tip of a coupling convexity on a core segment to deform during bending of the serial core segment assembly into an annular form when forming the serial core segment assembly by engaging a coupling convexity formed on one of the core segments with an adjacent core segment, and when forming the magnetic circuit by bending the serial core segment assembly into an annular form.

3. A method of manufacturing a core for rotary electric machines, comprising:

forming a plurality of core segments by laminating core division sheets having tees; and obtaining a magnetic circuit by forming a serial core segment assembly by mating complementary interlocking portions of adjacent core segments with one another, bending the serial core segment assembly into an annular form so that yokes of all the adjacent core segments are brought into contact with one another and the yokes of core segments located at both ends of the serial core segment assembly contact each other.

4. A method of manufacturing a core for rotary electric machines according to claim 3, wherein the adjacent core segments are mated with each other to form the serial core segment assembly by mating complementary interlocking portions of the adjacent core segments with one another, at a location to form an outer circumference when a magnetic circuit is formed by bending the serial core segment assembly into the annular form.

5. A method of manufacturing a core for rotary electric machines according to claim 3, wherein both ends of the serial core segment assembly are fixed to each other by welding or cementing after the magnetic circuit is formed by bending the serial core segment assembly into the annular form and bringing yokes of core segments, located at both ends of the serial core segment assembly, into contact with each other.

6. A method of manufacturing a core for rotary electric machines according to claim 3, further comprising forming a magnetic circuit by continuously winding a wire in series over a plurality of tees of a serial core segment assembly and bending the serial core segment assembly having the continuous windings into an annular form.

7. A method of manufacturing a core for rotary electric machines according to claim 3, further comprising welding a portion which is to form an outer circumference of a coupled portion between both ends of a serial core segment assembly after the magnetic circuit is formed by bending the serial core segment assembly into the annular form and bringing the yokes of the core segments of the serial core segment assembly into contact with each other.

* * * * *